United States Patent
Nakagawa

(10) Patent No.: US 11,846,331 B2
(45) Date of Patent: Dec. 19, 2023

(54) CONTROL DEVICE

(71) Applicant: DENSO CORPORATION, Kariya (JP)

(72) Inventor: Masashi Nakagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/180,413

(22) Filed: Mar. 8, 2023

(65) Prior Publication Data

US 2023/0220889 A1    Jul. 13, 2023

Related U.S. Application Data

(63) Continuation of application No. PCT/JP2021/033707, filed on Sep. 14, 2021.

(30) Foreign Application Priority Data

Sep. 15, 2020 (JP) .................................. 2020-154939

(51) Int. Cl.
*F16D 48/06* (2006.01)
*F16D 13/52* (2006.01)

(52) U.S. Cl.
CPC .............. *F16D 48/06* (2013.01); *F16D 13/52* (2013.01); *F16D 2500/1023* (2013.01); *F16D 2500/1045* (2013.01); *F16D 2500/10412* (2013.01); *F16D 2500/1107* (2013.01); *F16D 2500/3166* (2013.01)

(58) Field of Classification Search
CPC .. F16D 48/06; F16D 13/52; F16D 2500/1023; F16D 2500/10412; F16D 2500/1045; F16D 2500/1107; F16D 2500/3166
See application file for complete search history.

(56) References Cited

U.S. PATENT DOCUMENTS

| | | | |
|---|---|---|---|
| 6,607,253 B1* | 8/2003 | Yamamoto | B60T 7/042 303/155 |
| 2013/0169196 A1* | 7/2013 | Markham | H02P 6/08 318/3 |
| 2016/0069402 A1* | 3/2016 | Chimner | F16D 48/066 701/67 |
| 2017/0261049 A1 | 9/2017 | Nozu et al. | |
| 2018/0119757 A1* | 5/2018 | Kinch | F16H 61/061 |

* cited by examiner

*Primary Examiner* — Edwin A Young
(74) *Attorney, Agent, or Firm* — Nixon & Vanderhye P.C.

(57) ABSTRACT

A control device controls a torque transmission device. The torque transmission device includes an actuator that operates by being energized and a torque transmission portion that is switched to a transmission state or a non-transmission state by the actuator operating, and transmits a torque between a first transmission portion and a second transmission portion when the torque transmission portion is in the transmission state. The control device includes a target calculation unit, a mode determination unit, and a control unit. The target calculation unit calculates a target transmission torque that is a torque to be transmitted between the first transmission portion and the second transmission portion. The mode determination unit determines an operating mode among an engagement mode, a release mode, and a steady mode. The control unit controls the actuator based on the operating mode determined by the mode determination unit.

14 Claims, 15 Drawing Sheets

CONTROL DEVICE

CROSS REFERENCE TO RELATED APPLICATIONS

The present application is a continuation application of International Patent Application No. PCT/JP2021/033707 filed on Sep. 14, 2021, which designated the U.S. and claims the benefit of priority from Japanese Patent Application No. 2020-154939 filed on Sep. 15, 2020. The entire disclosures of all of the above applications are incorporated herein by reference.

TECHNICAL FIELD

The present disclosure relates to a control device.

BACKGROUND

There is known a torque transmission device including an actuator that operates by being energized and a torque transmission portion that is switched to a transmission state or a non-transmission state by the operation of the actuator. The torque transmission device transmits a torque between a first transmission portion and a second transmission portion when the torque transmission portion is in the transmission state. There is also known a control device that controls the torque transmission device.

SUMMARY

The present disclosure provides a control device that controls a torque transmission device. The torque transmission device includes an actuator that operates by being energized and a torque transmission portion that is switched to a transmission state or a non-transmission state by the actuator operating, and transmits a torque between a first transmission portion and a second transmission portion when the torque transmission portion is in the transmission state. The control device includes a target calculation unit, a mode determination unit, and a control unit. The target calculation unit calculates a target transmission torque that is a torque to be transmitted between the first transmission portion and the second transmission portion. The mode determination unit determines that an operating mode is an engagement mode when the target transmission torque increases over time, determine that the operating mode is a release mode when the target transmission torque decreases over time, and determine that the operating mode is a steady mode when the target transmission torque does not change over time. The control unit controls the actuator based on the operating mode determined by the mode determination unit.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
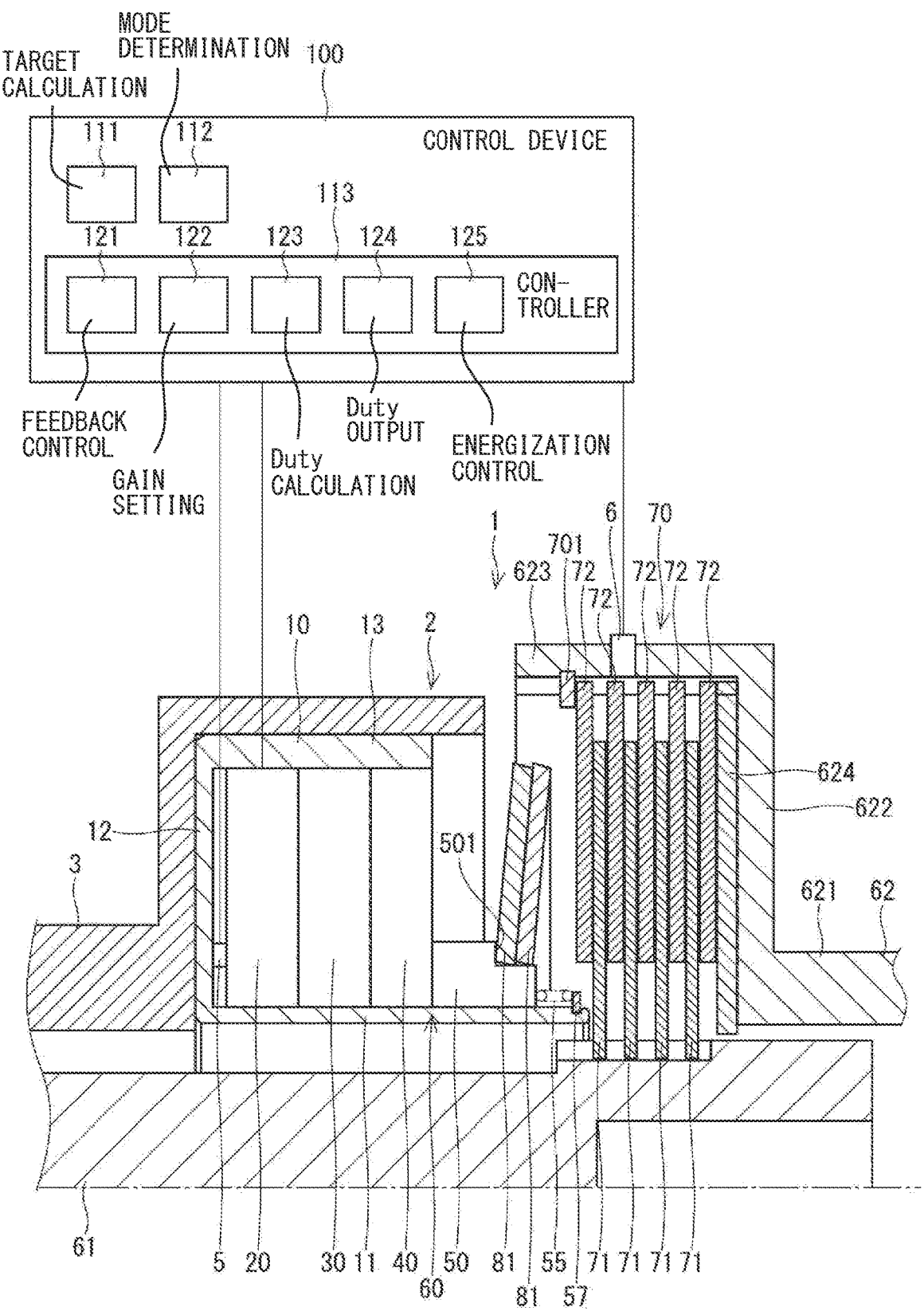
FIG. 1 is a schematic diagram illustrating a torque transmission device and a control device according to a first embodiment.

For example, in an exemplary torque transmission device, an actuator includes an electric motor, converts a rotational movement of the electric motor into a translational movement, and presses a clutch serving as a torque transmission portion to switch a state of the clutch to a transmission state or a non-transmission state. In a control device, the actuator is feedback-controlled. Here, according to a magnitude of a detection current of the electric motor, the control device increases a gain used for the feedback control because the current is small in a backlash elimination period between the actuator and the clutch, and decreases the gain because the current is large in a thrust control period after the contact with the clutch. Accordingly, both responsiveness and controllability are achieved.

Meanwhile, in a general clutch system, responsiveness varies between a time of engaging to shift to a transmission state and a time of releasing to shift to a non-transmission state. Therefore, in a case in which the same control parameter such as a gain or a gain correction amount is used for the engagement and the release, if the responsiveness is given priority, overshoot or undershoot during the engagement or the release may increase. In order to eliminate the overshoot or the undershoot during both the engagement and the release, it is necessary to set a control parameter with which the responsiveness during both the engagement and the release is limited.

For example, with a control parameter specialized for an engagement response, although the engagement response can achieve a maximum performance as a system, the release becomes too fast, which may cause undershoot or oscillation. With a control parameter specialized for a release response, although the release response can achieve a maximum performance, the engagement may be delayed. Further, with a mid-range gain with which the overshoot or the undershoot during both the engagement and the release is eliminated, there is a possibility that a maximum response cannot be achieved during both the engagement and the release.

The present disclosure provides a control device capable of appropriately achieving a transmission performance according to an operating mode of a torque transmission device.

An exemplary embodiment of the present disclosure provides a control device that controls a torque transmission device. The torque transmission device includes an actuator that operates by being energized and a torque transmission portion that is switched to a transmission state or a non-transmission state by the actuator operating. The torque transmission device transmits a torque between a first transmission portion and a second transmission portion when the torque transmission portion is in the transmission state. The control device includes a target calculation unit, a mode determination unit, and a control unit. The target calculation unit calculates a target transmission torque that is a torque to be transmitted between the first transmission portion and the second transmission portion. The mode determination unit determines that an operating mode is an engagement mode when the target transmission torque increases over time, determine that the operating mode is a release mode when the target transmission torque decreases over time, and determines that the operating mode is a steady mode when the target transmission torque does not change over time. The control unit controls the actuator based on the operating mode determined by the mode determination unit. The feedback control unit feedback-controls the actuator based on the target transmission torque. The gain setting unit sets an engagement gain that is a gain used for feedback control executed by the feedback control unit, and a release gain that is a gain smaller than the engagement gain. The duty calculation unit calculates an engagement duty based on the engagement gain and calculate a release duty based on the release gain. The duty output unit switches the engagement duty or the release duty based on the operating mode determined by the mode determination unit and output a switched duty as an output duty. The energization control unit controls energization of the actuator based on the output duty output from the duty output unit.

In the exemplary embodiment of the present disclosure, the actuator can be feedback-controlled based on the engagement gain in the engagement mode, that is, during engagement, and the actuator can be feedback-controlled based on the release gain smaller than the engagement gain in the release mode, that is, during release. Therefore, it is possible to limit undershoot and oscillation during release while improving responsiveness during engagement. Therefore, a transmission performance can be appropriately achieved according to the operating mode of the torque transmission device.

Hereinafter, torque transmission devices and control devices according to multiple embodiments will be described with reference to the drawings. In the multiple embodiments, substantially the same components are denoted by the same reference signs, and the description thereof will be omitted.

First Embodiment

A torque transmission device and a control device according to a first embodiment are illustrated in FIG. 1. A torque transmission device 1 is, for example, a clutch device, is provided between an internal combustion engine and a transmission of a vehicle, and is used to allow or block transmission of a torque between the internal combustion engine and the transmission. A control device 100 is used to control the torque transmission device 1.

The torque transmission device 1 includes an actuator 2 and a clutch 70 serving as a "torque transmission portion". The actuator 2 includes a housing 10, an electric motor 20, a speed reducer 30, a rotational translation unit 60, and a pressing unit 81.

The torque transmission device 1 includes an input shaft 61 as a "first transmission portion" and an output shaft 62 as a "second transmission portion".

The control device 100 is, for example, an electronic control unit, that is, an ECU, and is a small computer including a CPU as a calculation unit, a ROM, a RAM, and the like as storage units, and an I/O and the like as input and output units. Based on information such as signals from various sensors provided in parts of the vehicle, the control device 100 executes a calculation according to a program stored in the ROM or the like and controls operation of various devices and machines of the vehicle. In this way, the control device 100 executes the program stored in a non-transitory tangible storage medium. With the execution of the program, a method corresponding to the program is executed.

The control device 100 can control operation of the internal combustion engine and the like based on the information such as the signals from various sensors. The control device 100 can control operation of the electric motor 20, which will be described later.

The input shaft 61 is connected to, for example, a drive shaft (not illustrated) of the internal combustion engine, and is rotatable together with the drive shaft. That is, a torque from the drive shaft is input to the input shaft 61.

The vehicle equipped with the internal combustion engine is provided with a fixing flange 3 (see FIG. 1). The fixing flange 3 is formed in a tubular shape, and is fixed to, for example, an engine compartment of the vehicle. The input shaft 61 is supported by the fixing flange 3 via, for example, a bearing.

The housing 10 is provided between an inner peripheral wall of an end portion of the fixing flange 3 and an outer peripheral wall of the input shaft 61. The housing 10 includes a housing inner cylinder portion 11, a housing plate portion 12, a housing outer cylinder portion 13, and the like.

The housing inner cylinder portion 11 is formed in a substantially cylindrical shape. The housing plate portion 12 is formed in an annular plate shape in a manner of extending radially outward from an end portion of the housing inner cylinder portion 11. The housing outer cylinder portion 13 is formed in a substantially cylindrical shape in a manner of extending from an outer edge portion of the housing plate portion 12 to the same side as the housing inner cylinder portion 11. Here, the housing inner cylinder portion 11, the housing plate portion 12, and the housing outer cylinder portion 13 are integrally formed of, for example, metal.

The housing 10 is fixed to the fixing flange 3 such that outer walls of the housing plate portion 12 and the housing outer cylinder portion 13 are in contact with a wall surface of the fixing flange 3 (see FIG. 1). The housing 10 is fixed to the fixing flange 3 by a bolt or the like (not illustrated).

Here, the housing 10 is provided coaxially with the fixing flange 3 and the input shaft 61.

The electric motor 20 is provided, for example, among the housing inner cylinder portion 11, the housing plate portion 12, and the housing outer cylinder portion 13. The electric motor 20 includes a stator and a rotor (not illustrated), and can output a torque from the rotor by being energized.

The control device 100 can control the operation of the electric motor 20 by controlling electric power to be supplied to the electric motor 20.

In the present embodiment, the torque transmission device 1 includes a rotation angle sensor 5. The rotation angle sensor 5 is provided, for example, between the electric motor 20 and the housing plate portion 12. The rotation angle sensor 5 detects a rotation angle of the electric motor 20 and outputs a signal corresponding to the rotation angle to the control device 100. Accordingly, the control device 100 can detect the rotation angle, a rotation speed, and the like of the electric motor 20 based on the signal from the rotation angle sensor 5.

The speed reducer 30 is provided, for example, on a side opposite to the housing plate portion 12 with respect to the electric motor 20 between the housing inner cylinder portion 11 and the housing outer cylinder portion 13. A torque of the electric motor 20 is input to the speed reducer 30. The speed reducer 30 outputs the torque of the electric motor 20 at a reduced speed.

The rotational translation unit 60 includes a rotation portion 40 and a translation portion 50. The rotation portion 40 is formed in, for example, an annular shape, and is provided on a side opposite to the electric motor 20 with respect to the speed reducer 30 between the housing inner cylinder portion 11 and the housing outer cylinder portion 13. The torque of the electric motor 20 decelerated by the speed reducer 30 is input to the rotation portion 40. When the torque is received from the speed reducer 30, the rotation portion 40 rotates relative to the housing 10.

The translation portion 50 is formed in, for example, a tubular shape, and is provided on a side opposite to the speed reducer 30 with respect to the rotation portion 40 on a radially outer side of the housing inner cylinder portion 11. When the rotation portion 40 rotates relative to the housing 10, the translation portion 50 moves relative to the housing 10 in an axial direction.

In the present embodiment, the torque transmission device 1 includes a return spring 55 and a C ring 57. The return spring 55 is provided, for example, on a side opposite to the rotation portion 40 with respect to the translation portion 50 on the radially outer side of the housing inner cylinder portion 11. The C ring 57 is provided on, for example, an outer peripheral wall of the housing inner cylinder portion 11 in a manner of being positioned on a side opposite to the translation portion 50 with respect to the return spring 55. One end of the return spring 55 is in contact with the translation portion 50, and the other end is in contact with the C ring 57. The return spring 55 biases the translation portion 50 toward the rotation portion 40.

The output shaft 62 includes a shaft portion 621, a plate portion 622, a cylinder portion 623, and a friction plate 624 (see FIG. 1). The shaft portion 621 is formed in a substantially cylindrical shape. The plate portion 622 is integrally provided with the shaft portion 621 in a manner of extending radially outward from one end of the shaft portion 621 in an annular plate shape. The cylinder portion 623 is integrally provided with the plate portion 622 in a manner of extending in a substantially cylindrical shape from an outer edge portion of the plate portion 622 toward a side opposite to the shaft portion 621. The friction plate 624 is formed in a substantially annular plate shape, and is provided on an end surface of the plate portion 622 on a cylinder portion 623 side. Here, the friction plate 624 is not relatively rotatable with respect to the plate portion 622.

An end portion of the input shaft 61 passes through the inside of the housing inner cylinder portion 11 and is positioned on a side opposite to the rotation portion 40 with respect to the translation portion 50. The output shaft 62 is provided coaxially with the input shaft 61 on a side opposite to the fixing flange 3 with respect to the housing 10, that is, on a side opposite to the rotation portion 40 with respect to the translation portion 50. The output shaft 62 is supported by the input shaft 61 via, for example, a bearing. The input shaft 61 and the output shaft 62 are relatively rotatable with respect to the housing 10.

The clutch 70 is provided between the input shaft 61 and the output shaft 62 inside the cylinder portion 623. The clutch 70 includes inner friction plates 71, outer friction plates 72, and a locking portion 701. The multiple inner friction plates 71 are each formed in a substantially annular plate shape, and are aligned in the axial direction between the input shaft 61 and the cylinder portion 623 of the output shaft 62. The inner friction plates 71 are provided such that inner edge portions thereof are spline-coupled to the outer peripheral wall of the input shaft 61. Therefore, the inner friction plates 71 are not relatively rotatable with respect to the input shaft 61 and are capable of relatively moving with respect to the input shaft 61 in the axial direction.

The multiple outer friction plates 72 are each formed in a substantially annular plate shape, and are aligned in the axial direction between the input shaft 61 and the cylinder portion 623 of the output shaft 62. Here, the inner friction plates 71 and the outer friction plates 72 are alternately arranged in the axial direction of the input shaft 61. The outer friction plates 72 are provided such that outer edge portions thereof are spline-coupled to an inner peripheral wall of the cylinder portion 623 of the output shaft 62. Therefore, the outer friction plates 72 are not relatively rotatable with respect to the output shaft 62 and are capable of relatively moving with respect to the output shaft 62 in the axial direction. Among the multiple outer friction plates 72, the outer friction plate 72 positioned closest to the friction plate 624 can come into contact with the friction plate 624.

The locking portion 701 is formed in a substantially annular shape, and is provided such that an outer edge portion is fitted into the inner peripheral wall of the cylinder portion 623 of the output shaft 62. The locking portion 701 can lock an outer edge portion of the outer friction plate 72 positioned closest to the translation portion 50 among the multiple outer friction plates 72. Therefore, the multiple outer friction plates 72 and the multiple inner friction plates 71 are prevented from coming off from the inside of the cylinder portion 623. A distance between the locking portion 701 and the friction plate 624 is larger than a sum of plate thicknesses of the multiple outer friction plates 72 and the multiple inner friction plates 71.

In an engaged state in which the multiple inner friction plates 71 and the multiple outer friction plates 72 are in contact with each other, that is, are engaged with each other, a frictional force is generated between the inner friction plates 71 and the outer friction plates 72, and relative rotation between the inner friction plates 71 and the outer friction plates 72 is restricted according to a magnitude of the frictional force. On the other hand, in a disengaged state in which the multiple inner friction plates 71 and the multiple outer friction plates 72 are separated from each other, that is, are not engaged with each other, no frictional force is generated between the inner friction plates 71 and the outer friction plates 72, and the relative rotation between the inner friction plates 71 and the outer friction plates 72 is not restricted. Here, the "engaged state" corresponds to a "transmission state", and the "disengaged state" corresponds to a "non-transmission state".

When the clutch 70 is in the engaged state, the torque input to the input shaft 61 is transmitted to the output shaft 62 via the clutch 70. On the other hand, when the clutch 70 is in the disengaged state, the torque input to the input shaft 61 is not transmitted to the output shaft 62.

In this way, the clutch 70 serving as the "torque transmission portion" transmits the torque between the input shaft 61 and the output shaft 62. The clutch 70 allows transmission of the torque between the input shaft 61 and the output shaft 62 in the engaged state in which the clutch 70 is engaged, and blocks the transmission of the torque between the input shaft 61 and the output shaft 62 in the disengaged state in which the clutch 70 is not engaged.

In the present embodiment, the torque transmission device 1 is a so-called normally open type torque transmission device that is normally in a disengaged state when the electric motor 20 is not energized.

The pressing unit 81 includes two disk springs. The two disk springs are provided such that inner edge portions thereof are positioned in a step portion 501 formed on an outer peripheral wall of an end portion of the translation portion 50 on a clutch 70 side in a state in which the disk springs overlap each other in the axial direction. The pressing unit 81 is elastically deformable in the axial direction.

When the electric motor 20 is not energized, a distance between the rotation portion 40 and the translation portion 50 is relatively small, and a gap is formed between an outer edge portion of the pressing unit 81 and the clutch 70 (see FIG. 1). Therefore, the clutch 70 is in the disengaged state, and the transmission of torque between the input shaft 61 and the output shaft 62 is blocked.

Here, when electric power is supplied to the electric motor 20 under the control of the control device 100, the electric motor 20 rotates, the torque is output from the speed reducer 30, and the rotation portion 40 relatively rotates with respect to the housing 10. Accordingly, the translation portion 50 relatively moves with respect to the housing 10 in the axial direction, that is, moves toward the clutch 70 while compressing the return spring 55. Accordingly, the pressing unit 81 moves toward the clutch 70.

When the pressing unit 81 moves toward the clutch 70 due to the movement of the translation portion 50 in the axial direction, the gap between the pressing unit 81 and the clutch 70 becomes small, and the outer edge portion of the pressing unit 81 comes into contact with the outer friction plate 72 of the clutch 70. When the translation portion 50 further moves in the axial direction after the pressing unit 81 comes into contact with the clutch 70, the pressing unit 81 presses the outer friction plate 72 toward the friction plate 624 while being elastically deformed in the axial direction. Accordingly, the multiple inner friction plates 71 and the multiple outer friction plates 72 are engaged with each other, and the clutch 70 is brought into the engaged state. Therefore, the transmission of the torque between the input shaft 61 and the output shaft 62 is allowed.

When a clutch transmission torque reaches a clutch required torque capacity, the control device 100 stops the rotation of the electric motor 20. Accordingly, the clutch 70 is brought into an engagement maintaining state in which the clutch transmission torque is maintained at the clutch required torque capacity. In this way, by the torque of the electric motor 20, the pressing unit 81 can move in the axial direction and press the clutch 70 to switch the state of the clutch 70 to the engaged state or the disengaged state.

In the output shaft 62, an end portion of the shaft portion 621 opposite to the plate portion 622 is connected to an input shaft of the transmission (not illustrated), and the output shaft 62 is rotatable together with the input shaft. That is, the torque output from the output shaft 62 is input to the input shaft of the transmission. The torque input to the transmission is changed in speed by the transmission, and is output to driving wheels of the vehicle as a drive torque. Accordingly, the vehicle travels.

In the present embodiment, the torque transmission device 1 includes a temperature sensor 6. The temperature sensor 6 is provided on, for example, the cylinder portion 623 of the output shaft 62. The temperature sensor 6 detects temperatures of the clutch 70 and lubricant of the clutch 70, and outputs signals corresponding to the temperatures to the control device 100. Accordingly, the control device 100 can detect the temperatures of the clutch 70 and the lubricant based on the signals from the temperature sensor 6.

As illustrated in FIG. 1, according to the present embodiment, the control device 100 includes the actuator 2 that operates by being energized and the clutch 70 serving as the "torque transmission portion" that is switched to the transmission state or the non-transmission state by the operation of the actuator 2, and controls the torque transmission device 1 that transmits the torque between the input shaft 61 and the output shaft 62 when the clutch 70 is in the transmission state. The control device 100 includes a target calculation unit 111, a mode determination unit 112, and a control unit 113 as conceptual functional units.

Figure 2:
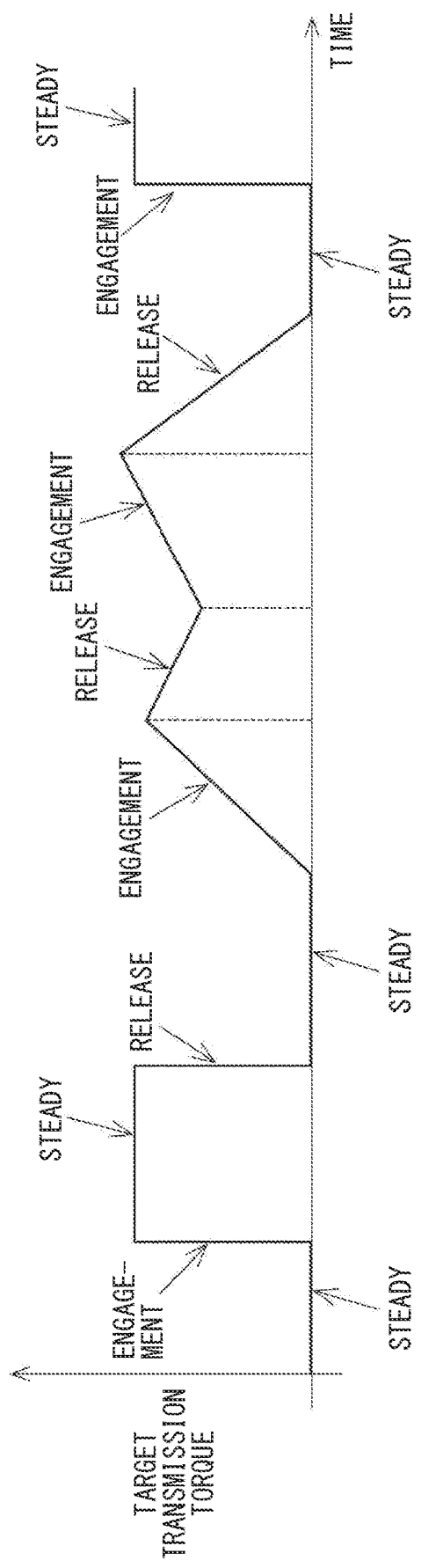
FIG. 2 is a diagram illustrating a target transmission torque that changes over time in the torque transmission device according to the first embodiment.

The target calculation unit 111 calculates a target transmission torque that is a torque to be transmitted between the input shaft 61 and the output shaft 62. The mode determination unit 112 determines that an operating mode is an engagement mode when the target transmission torque increases over time, determines that the operating mode is a release mode when the target transmission torque decreases over time, and determines that the operating mode is a steady mode when the target transmission torque does not change over time (see FIG. 2). The control unit 113 controls the actuator 2 based on the mode determined by the mode determination unit 112.

Here, the "engagement mode" is a mode in which the pressing unit 81 is moved toward the clutch 70 by the actuator 2 to bring the clutch 70 into the engaged state, that is, to engage the clutch 70. The "release mode" is a mode in which the pressing unit 81 is moved to a side opposite to the clutch 70 by the actuator 2 to bring the clutch 70 into the disengaged state, that is, to release the clutch 70. The "steady mode" is a mode in which the pressing unit 81 is held at a predetermined position to maintain the state of the clutch 70 in the engaged state or the disengaged state.

The control unit 113 includes a feedback control unit 121, a gain setting unit 122, a duty calculation unit 123, a duty output unit 124, and an energization control unit 125. The feedback control unit 121 feedback-controls the actuator 2 based on the target transmission torque. The gain setting unit 122 sets an engagement gain that is a gain used for feedback control executed by the feedback control unit 121, and a release gain that is a gain smaller than the engagement gain.

The duty calculation unit 123 can calculate an engagement duty based on the engagement gain and calculate a release duty based on the release gain. Based on the mode determined by the mode determination unit 112, the duty output unit 124 can switch the engagement duty or the release duty and output the switched duty as an output duty. The energization control unit 125 controls energization of the actuator 2 based on the output duty output from the duty output unit 124. In the present specification, the term "duty" means a "duty ratio" obtained by dividing a pulse width of a signal by a pulse period (cycle).

Figure 3:
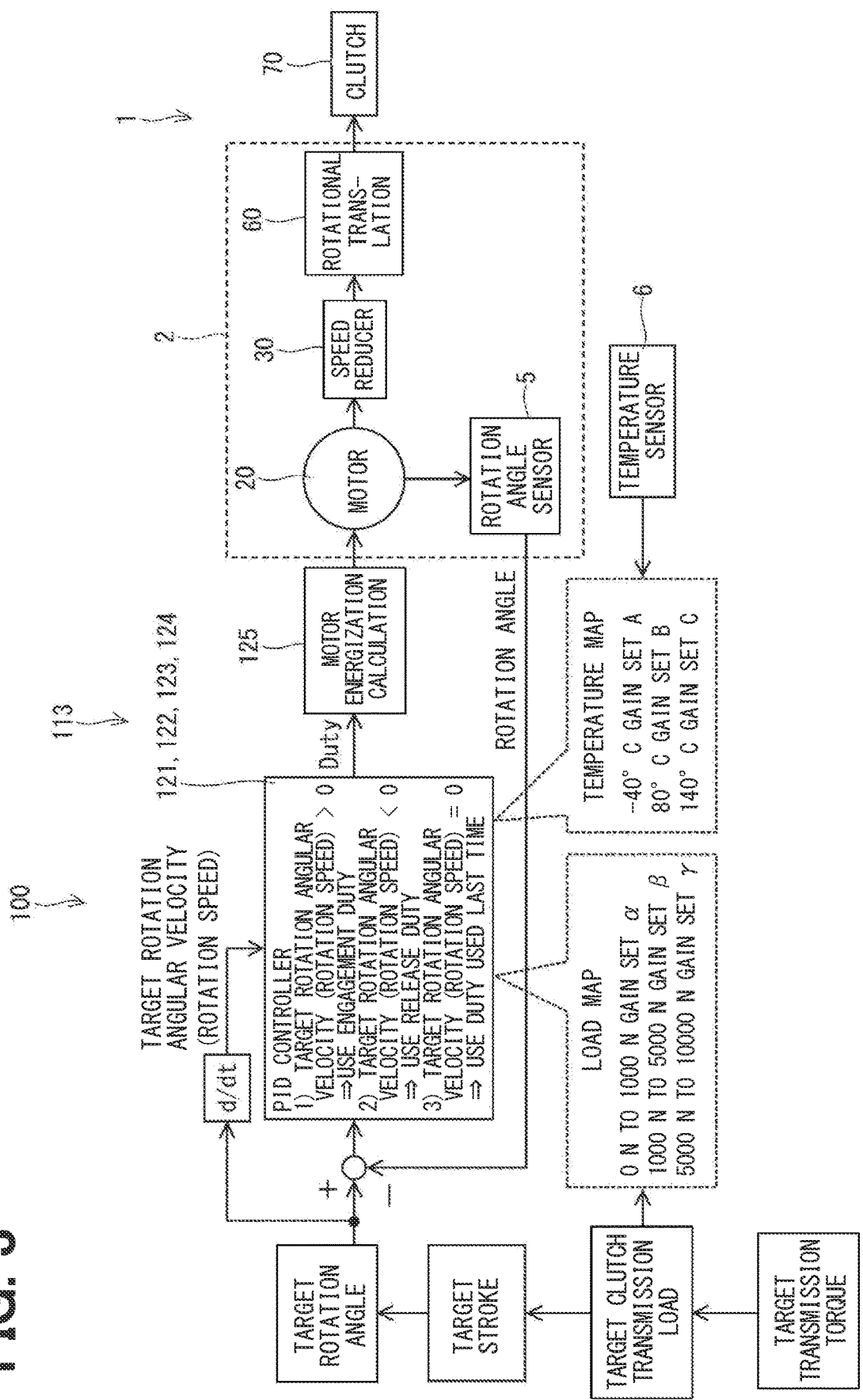
FIG. 3 is a block diagram illustrating the torque transmission device and the control device according to the first embodiment.

As illustrated in FIG. 3, a PID controller includes the feedback control unit 121, the gain setting unit 122, the duty calculation unit 123, and the duty output unit 124. In the present embodiment, the feedback control unit 121 PID-controls the electric motor 20 of the actuator 2 based on the target transmission torque and the rotation angle of the electric motor 20 detected by the rotation angle sensor 5. In the present embodiment, a feedback circuit is implemented by software.

Specifically, a target clutch transmission load, which is a load to be transmitted by the clutch 70, is calculated based on the target transmission torque. A target stroke, which is a target movement amount of the pressing unit 81 in the axial direction, is calculated based on the target clutch transmission load. A target rotation angle of the electric motor 20 is calculated based on the target stroke, and a rotation angle deviation which is a deviation between the target rotation angle and the rotation angle of the electric motor 20 detected by the rotation angle sensor 5 is input to the feedback control unit 121. A target rotation angular velocity, that is, a target rotation speed is calculated based on the target rotation angle, and is input to the feedback control unit 121.

The gain setting unit 122 sets the engagement gain, which is a predetermined value, and the release gain, which is a predetermined value smaller than the engagement gain.

Here, the gain setting unit 122 may set the engagement gain and the release gain based on the target clutch transmission load and a load map. Regarding the load map, for example, it is conceivable to set a gain set a (engagement gain and release gain) when the target clutch transmission load is 0 N to 1000 N, a gain set 13 (engagement gain and release gain) when the target clutch transmission load is 1000 N to 5000 N, and a gain set y (engagement gain and release gain) when the target clutch transmission load is 5000 N to 10000 N.

The gain setting unit 122 may set the engagement gain and the release gain based on the temperature of the clutch 70 and a temperature map. Regarding the temperature map, it is conceivable to set a gain set A (engagement gain and release gain) when the temperature of the clutch 70 is 31 40° C., a gain set B (engagement gain and release gain) when the temperature of the clutch 70 is 80° C., and a gain set C (engagement gain and release gain) when the temperature of the clutch 70 is 140° C. It is conceivable to calculate and set the engagement gain and the release gain by interpolation when the temperature of the clutch 70 is lower than −40° C., −40° C. to 80° C., 80° C. to 140° C., or higher than 140° C.

The duty calculation unit 123 calculates the engagement duty based on the engagement gain set by the gain setting unit 122, and calculates the release duty based on the release gain set by the gain setting unit 122.

Based on the mode determined by the mode determination unit 112, the duty output unit 124 switches the engagement duty or the release duty and outputs the switched duty as the output duty. Specifically, in the engagement mode, that is, when the target rotation angular velocity, that is, the target rotation speed is larger than 0, the engagement duty is used, and the engagement duty is output to the energization control unit 125 as the output duty. In the release mode, that is, when the target rotation angular velocity is smaller than 0, the release duty is used, and the release duty is output to the energization control unit 125 as the output duty. In the steady mode, the duty (the engagement duty or the release duty) used last time is output to the energization control unit 125 as the output duty.

Figure 4:
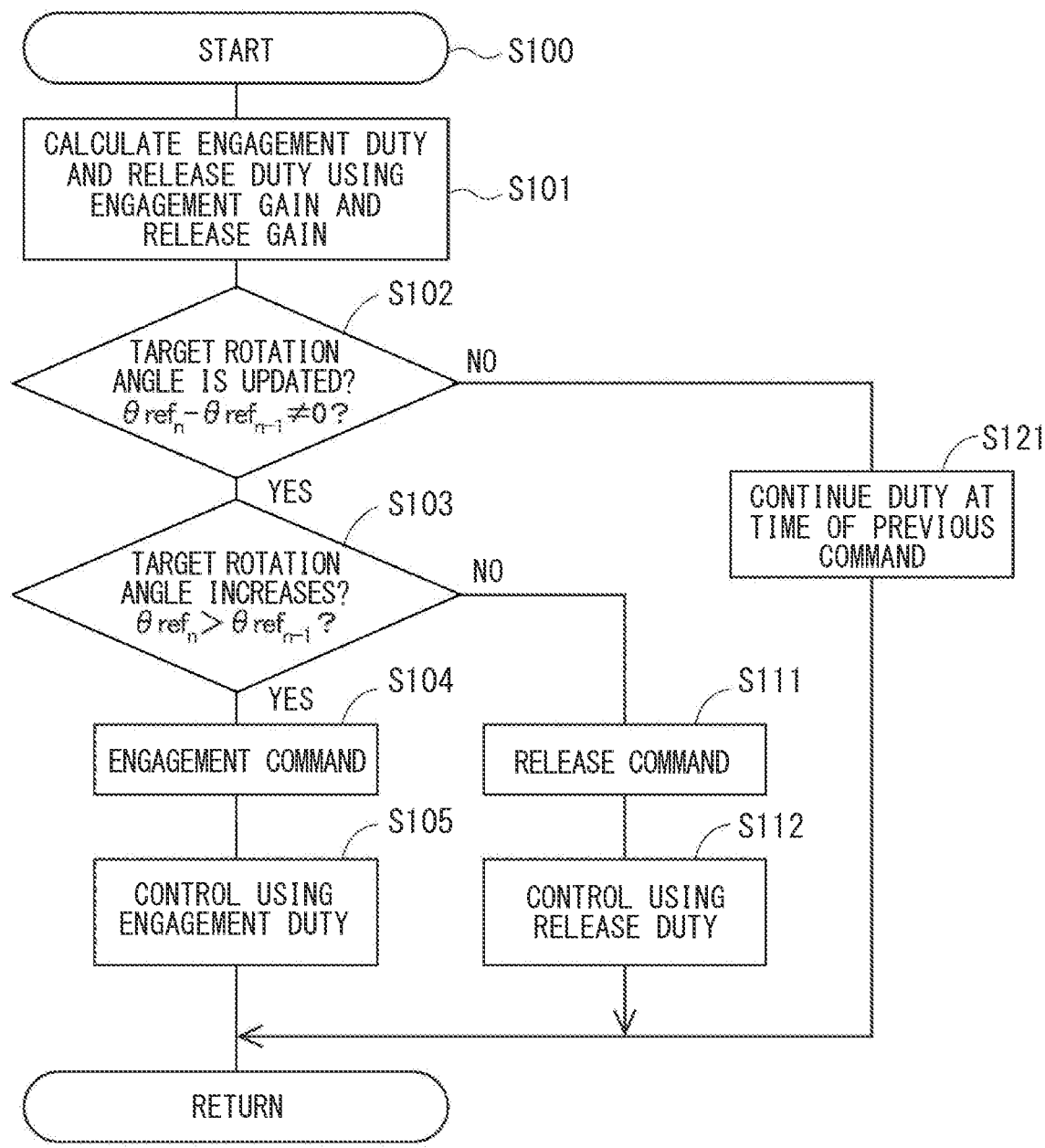
FIG. 4 is a flowchart illustrating processing related to actuator control executed by the control device according to the first embodiment.

A series of pieces of processing related to the control of the actuator 2 by the control device 100 are illustrated in FIG. 4.

S100 of the series of pieces of processing illustrated in FIG. 4 is started when, for example, an ignition key of the vehicle is turned on.

In S101, the control device 100 calculates the engagement duty and the release duty using the engagement gain and the release gain, respectively. After S101, the processing proceeds to S102.

In S102, the control device 100 determines whether the target rotation angle is updated. Specifically, the control device 100 determines whether a difference between a current value $\theta ref_n$ and a previous value $\theta ref_{n-1}$ of the target rotation angle is not 0 ($\neq 0$). When it is determined that the target rotation angle is updated (S102: YES), the processing proceeds to S103. On the other hand, when it is determined that the target rotation angle is not updated (S102: NO), the processing proceeds to S121.

In S103, the control device 100 determines whether the target rotation angle increases. Specifically, the control device 100 determines whether the current value $\theta ref_n$ of the target rotation angle is larger than the previous value $\theta ref_{n-1}$. When it is determined that the target rotation angle increases (S103: YES), the processing proceeds to S104. On the other hand, when it is determined that the target rotation angle does not increase (S103: NO), the processing proceeds to S111.

In S104, the control device 100 outputs an engagement command, which is a command for bringing the clutch 70 into the engaged state, that is, for engaging the clutch 70. After S104, the processing proceeds to S105.

In S105, the control device 100 controls the actuator 2 using the engagement duty. After S105, the processing exits S100 of the series of pieces of processing.

In S111, the control device 100 outputs a release command, which is a command for bringing the clutch 70 into the disengaged state, that is, for releasing the clutch 70. After S111, the processing proceeds to S112.

In S112, the control device 100 controls the actuator 2 using the release duty. After S112, the processing exits S100 of the series of pieces of processing.

In S121, the control device 100 controls the actuator 2 using the duty (the engagement duty in S105 or the release duty in S112) used at the time (S104 or S111) of the previous command. After S121, the processing exits S100 of the series of pieces of processing.

When S100 of the series of pieces of processing is exited after S105, S112, and S121, S100 of the series of pieces of processing is started again. In this way, S100 of the series of pieces of processing is repeatedly executed while the ignition key is on.

Figure 5:
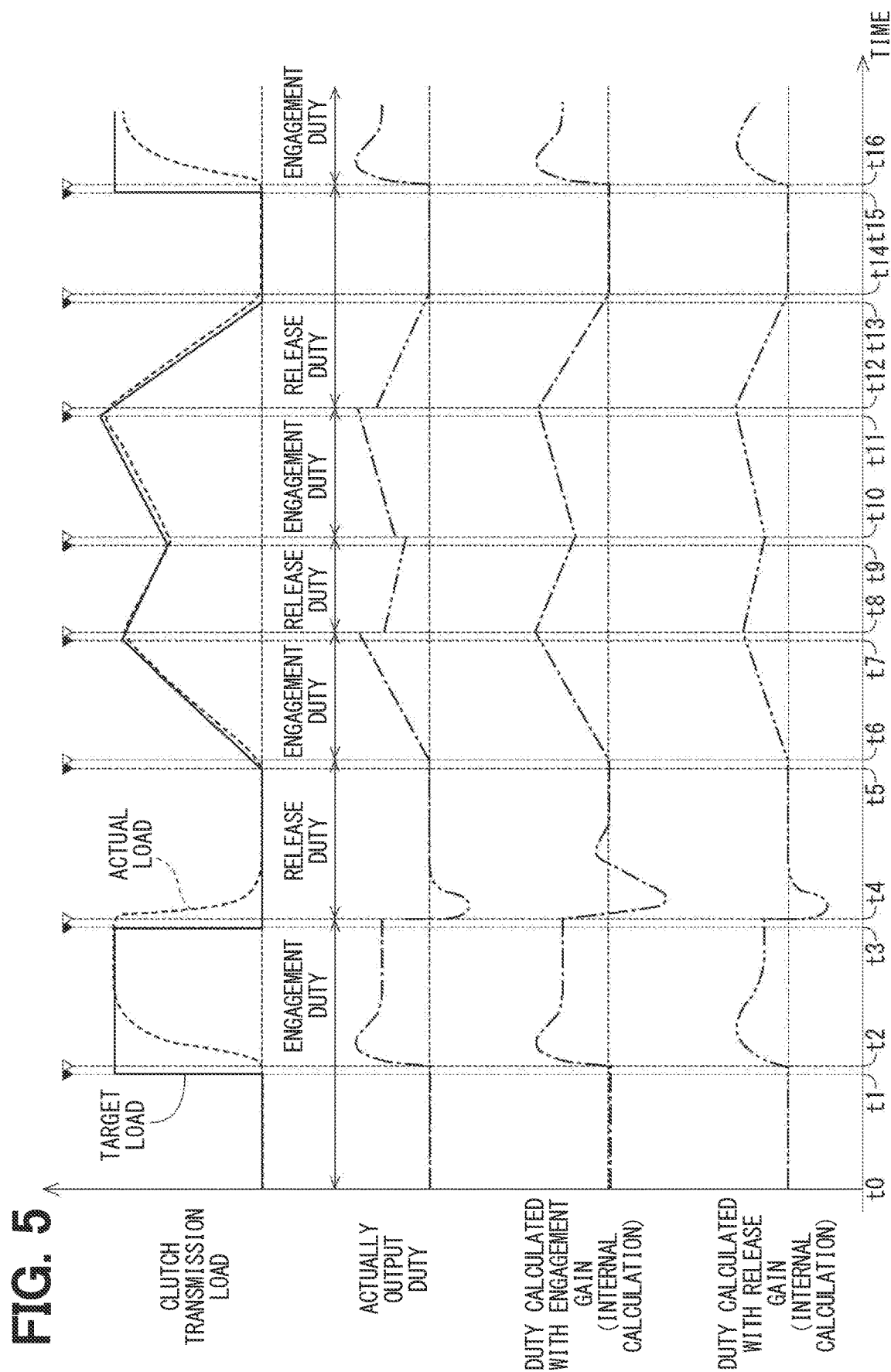
FIG. 5 is a diagram illustrating an operation example of the control device according to the first embodiment.

An operation example of the control device 100 is illustrated in FIG. 5.

After a time t0, the duty calculation unit 123 of the control device 100 calculates the engagement duty based on the engagement gain and calculates the release duty based on the release gain.

When the target clutch transmission load is changed at a time t1, the operating mode of the torque transmission device 1 is determined at a time t2. In this example, at the time t2, since the target transmission torque, that is, the target clutch transmission load increases over time, the mode determination unit 112 determines that the operating mode is the "engagement mode".

Times t1, t3, t5, t7, t9, t11, t13, and t15 are timings at which the target is changed. Times t2, t4, t6, t8, t10, t12, t14, and t16 are timings at which the engagement mode, the release mode, or the steady mode is determined and updated in a feedback cycle, and correspond to a calculation cycle of the feedback control unit 121.

Since the operating mode is determined to be the "engagement mode" at the time t2, the duty output unit 124 outputs the engagement duty as the output duty after the time t2.

When the target clutch transmission load is changed at the time t3, at the time t4, since the target transmission torque, that is, the target clutch transmission load decreases over time, the mode determination unit 112 determines that the operating mode is the "release mode".

Since the operating mode is determined to be the "release mode" at the time t4, the duty output unit 124 outputs the release duty as the output duty after the time t4.

When the target clutch transmission load is changed at the time t5, at the time t6, since the target transmission torque, that is, the target clutch transmission load increases over time, the mode determination unit 112 determines that the operating mode is the "engagement mode".

Since the operating mode is determined to be the "engagement mode" at the time t6, the duty output unit 124 outputs the engagement duty as the output duty after the time t6.

When the target clutch transmission load is changed at the time t7, at the time t8, since the target transmission torque, that is, the target clutch transmission load decreases over time, the mode determination unit 112 determines that the operating mode is the "release mode".

Since the operating mode is determined to be the "release mode" at the time t8, the duty output unit 124 outputs the release duty as the output duty after the time t8.

When the target clutch transmission load is changed at the time t9, at the time t10, since the target transmission torque, that is, the target clutch transmission load increases over time, the mode determination unit 112 determines that the operating mode is the "engagement mode".

Since the operating mode is determined to be the "engagement mode" at the time t10, the duty output unit 124 outputs the engagement duty as the output duty after the time t10.

When the target clutch transmission load is changed at the time t11, at the time t12, since the target transmission torque, that is, the target clutch transmission load decreases over time, the mode determination unit 112 determines that the operating mode is the "release mode".

Since the operating mode is determined to be the "release mode" at the time t12, the duty output unit 124 outputs the release duty as the output duty after the time t12.

When the target clutch transmission load is changed at the time t13, at the time t14, since the target transmission torque, that is, the target clutch transmission load does not change over time, the mode determination unit 112 determines that the operating mode is the "steady mode".

Since the operating mode is determined to be the "steady mode" at the time t14, the duty output unit 124 outputs the release duty, which is the duty output last time (from the time t12 to the time t14), as the output duty after the time t12.

When the target clutch transmission load is changed at the time t15, at the time t16, since the target transmission torque, that is, the target clutch transmission load increases over time, the mode determination unit 112 determines that the operating mode is the "engagement mode".

Since the operating mode is determined to be the "engagement mode" at the time t16, the duty output unit 124 outputs the engagement duty as the output duty after the time t16.

Figure 6:
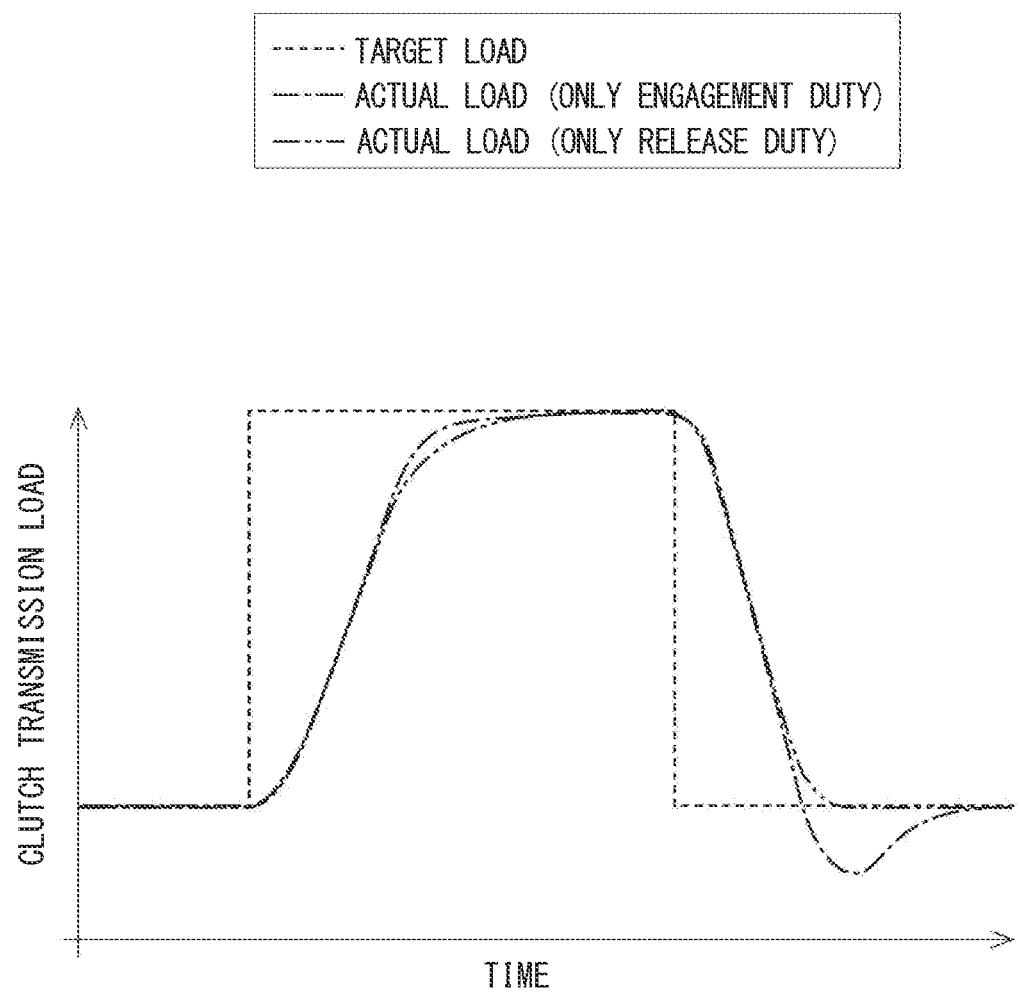
FIG. 6 is a diagram illustrating operation examples of a control device according to a comparative embodiment.

Operation examples of a control device according to a comparative embodiment are illustrated in FIG. 6.

Regardless of engagement and release, a clutch transmission load in the operation example according to the comparative embodiment in which only an engagement gain is used and only an engagement duty is output to feedback-control the actuator 2 is indicated by a one-dot chain line. In the case of this example, during the engagement, that is, in an engagement mode, there is no overshoot, and a high response is achieved. However, during the release, that is, in a release mode, undershoot is large, and convergence is slow.

Regardless of engagement and release, a clutch transmission load in the operation example according to the comparative embodiment in which only a release gain is used and only a release duty is output to feedback-control the actuator 2 is indicated by a two-dot chain line. In the case of this example, during the engagement, although there is no overshoot, reaching a target load is delayed. On the other hand, during the release, there is no undershoot, and convergence is fast.

Figure 7:
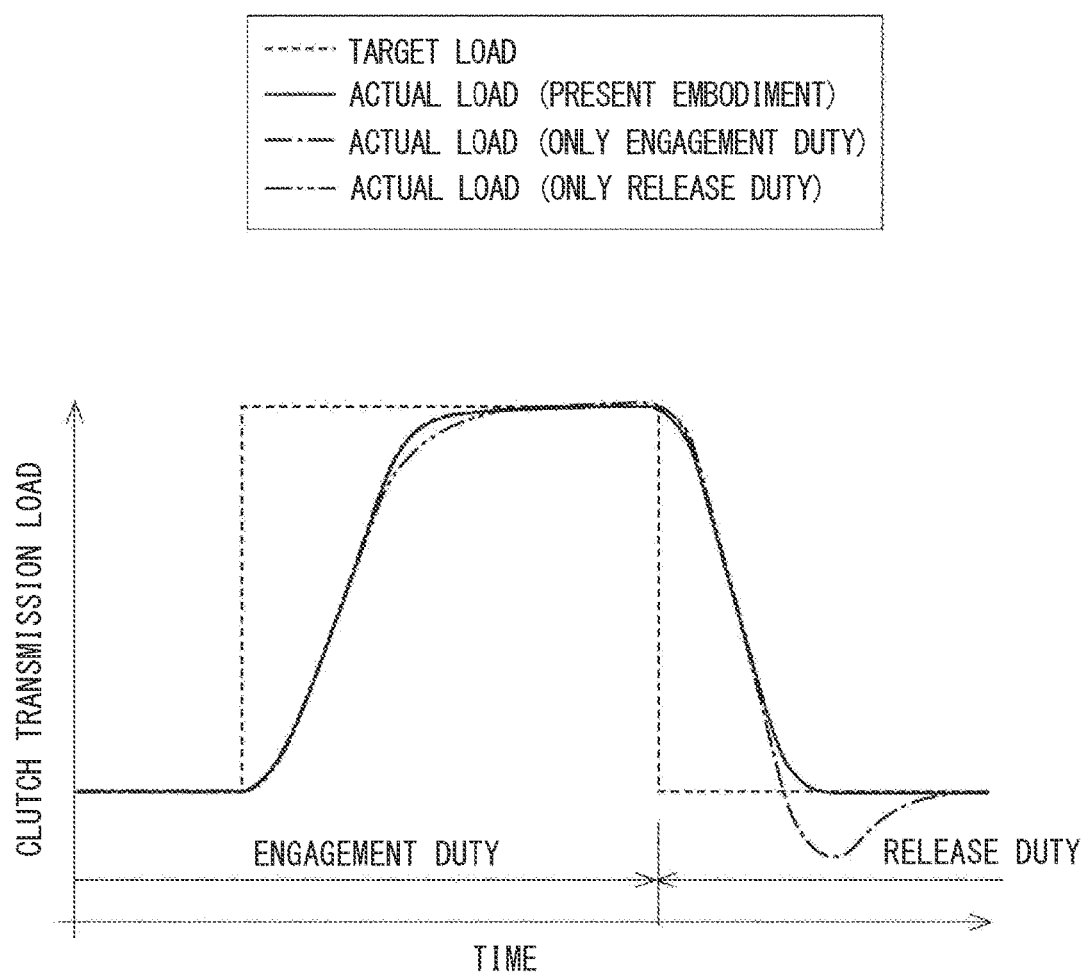
FIG. 7 is a diagram illustrating an operation example of the control device according to the first embodiment.

An operation example of the control device 100 according to the present embodiment is illustrated in FIG. 7.

In the present embodiment, as described above, during the engagement, the engagement gain is used and the engagement duty is output to feedback-control the actuator 2, and during the release, the release gain is used and the release duty is output to feedback-control the actuator 2.

Therefore, as illustrated in FIG. 7, during the engagement, there is no overshoot, and a high response is achieved. During the release, there is no undershoot, and convergence is fast. In this way, according to the present embodiment, the problem in the comparative embodiment described above can be solved.

As described above, in the present embodiment, the duty calculation unit 123 can calculate the engagement duty based on the engagement gain and calculate the release duty based on the release gain. Based on the mode determined by the mode determination unit 112, the duty output unit 124 can switch the engagement duty or the release duty and output the switched duty as an output duty. The energization control unit 125 controls energization of the actuator 2 based on the output duty output from the duty output unit 124.

In the present embodiment, the actuator 2 can be feedback-controlled based on the engagement gain in the engagement mode, that is, during the engagement, and the actuator 2 can be feedback-controlled based on the release gain smaller than the engagement gain in the release mode, that is, during the release. Therefore, it is possible to limit undershoot and oscillation during the release while improving responsiveness during the engagement. Therefore, a transmission performance can be appropriately achieved according to the operating mode of the torque transmission device 1.

Meanwhile, in a control device according to Patent Literature 1 (JP-A-2017-166522), when a failure occurs in a current detection of an electric motor, there is a possibility that both responsiveness and controllability of a torque transmission device cannot be achieved.

On the other hand, in the present embodiment, regardless of the current detection of the electric motor 20, as described above, it is possible to appropriately control the actuator 2 according to the operating mode of the torque transmission device 1 and to appropriately achieve the transmission performance in the torque transmission device 1.

The duty calculation unit 123 can calculate the engagement duty based on the engagement gain and calculate the release duty based on the release gain. Therefore, the duty output unit 124 can smoothly switch the engagement duty or the release duty and output the switched duty as the output duty.

In the present embodiment, the duty output is updated at the timing of the cycle of the feedback control. That is, in the present embodiment, the duty output unit 124 outputs the output duty in the same cycle as the calculation cycle of the feedback control unit 121. Therefore, a duty switching timing can be made faster, and the responsiveness can be improved.

In the present embodiment, the gain setting unit 122 can set the engagement gain or the release gain based on the target transmission torque or the temperature of the clutch 70. Therefore, it is possible to achieve the optimum transmission performance such as the responsiveness and stability according to the load or the temperature.

In the present embodiment, the actuator 2 includes the electric motor 20 that outputs a torque, and the pressing unit 81 that can move in the axial direction by the torque of the electric motor 20 and press the clutch 70 to switch the state of the clutch 70 to the transmission state or the non-transmission state.

The feedback control unit 121 feedback-controls the actuator 2 based on the target transmission torque and the rotation angle of the electric motor 20. Therefore, it is possible to cope with various controls regardless of a control target.

In the present embodiment, the torque transmission portion is the clutch 70 that is switched to the engaged state or the disengaged state by a pressing force output from the actuator 2.

In the present embodiment, the clutch 70 is of a type that connects and disconnects the input shaft 61 and the output shaft 62, of which one and the other rotate with respect to the fixing flange 3 or the like serving as "another member", and that transmits power. Here, the clutch 70 is of a friction type that can be engaged by friction of the friction plates (the inner friction plates 71 and the outer friction plates 72).

In the present embodiment, the clutch 70 is a wet clutch that can be lubricated by lubricant such as ATF.

In the present embodiment, the clutch 70 is a multi-disc clutch including multiple friction plates (the inner friction plates 71 and the outer friction plates 72).

Second Embodiment

A control device according to a second embodiment will be described with reference to FIG. 8. The second embodiment is different from the first embodiment in a method for controlling the actuator 2 by the control device 100.

Figure 8:
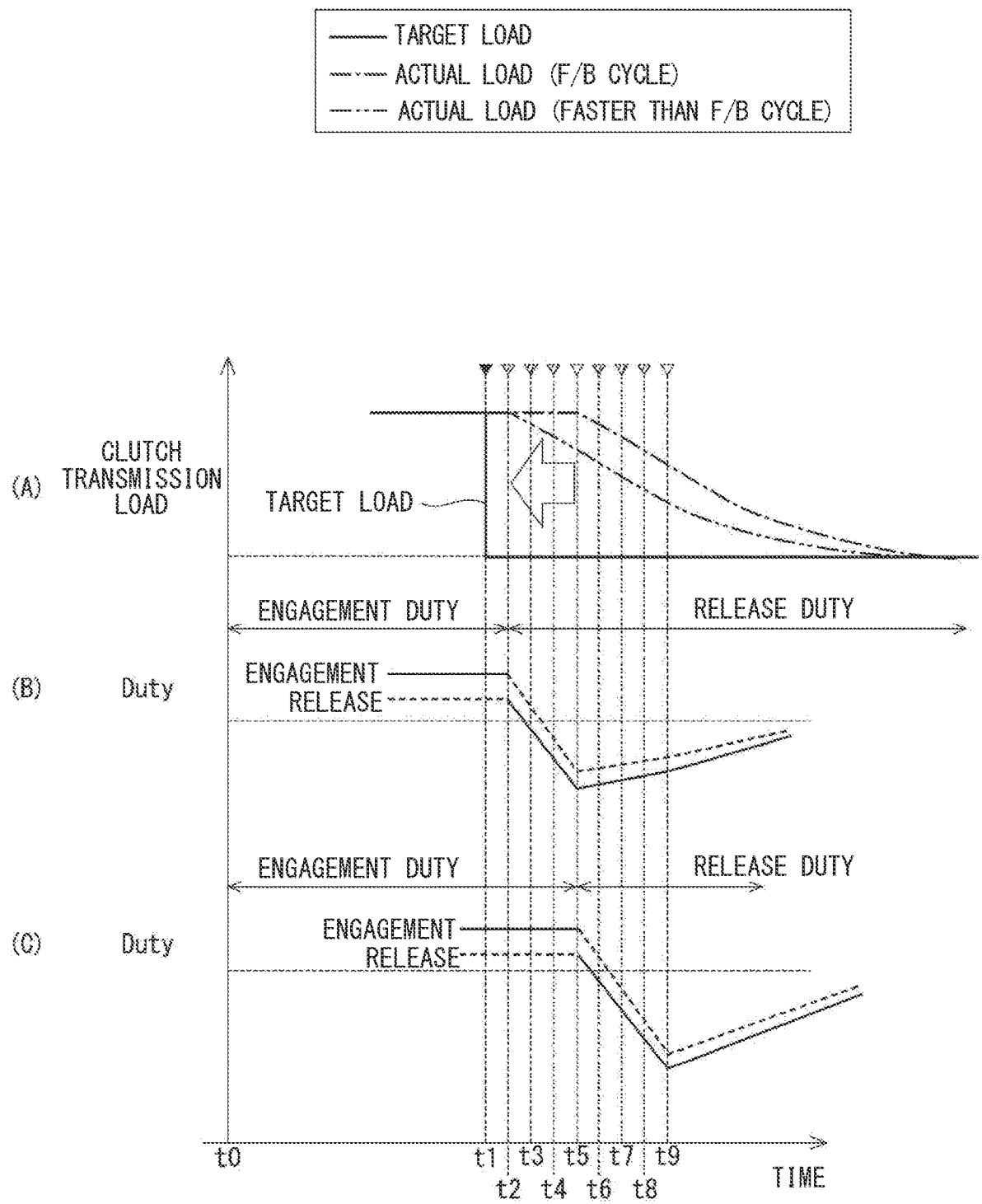
FIG. 8 is a diagram illustrating an operation example of a control device according to a second embodiment.

An operation example of the control device 100 is illustrated in a middle part (B) in FIG. 8. An upper part (A) in FIG. 8 illustrates a change over time in a clutch transmission load. The middle part (B) in FIG. 8 illustrates a change over time in a duty actually output when an interrupt update is executed at a timing faster than a feedback cycle. A lower part (C) in FIG. 8 illustrates a change over time in a duty actually output when the update is executed in the feedback cycle.

After a time t0, the duty calculation unit 123 of the control device 100 calculates the engagement duty based on the engagement gain and calculates the release duty based on the release gain.

When the target clutch transmission load is changed at a time t1, the operating mode of the torque transmission device 1 is determined at a time t2. In this example, at the time t2, since a target transmission torque, that is, the target clutch transmission load decreases over time, the mode determination unit 112 determines that the operating mode is a "release mode".

The time t1 is a timing at which the target is changed. Times t2, t3, t4, t6, t7, and t8 are times corresponding to cycles shorter than a calculation cycle of the feedback control unit 121. Times t5 and t9 are times corresponding to the calculation cycle of the feedback control unit 121.

Since the operating mode is determined to be the "release mode" at the time t2, the duty output unit 124 outputs the release duty as an output duty after the time t2.

As illustrated in the upper part (A) in FIG. 8, in the present embodiment, an actual load can quickly follow the target clutch transmission load.

An operation example in a case in which the duty is calculated and output in the calculation cycle of the feedback control unit 121 is illustrated in the lower part (C) in FIG. 8.

When the target clutch transmission load is changed at the time t1, the operating mode of the torque transmission device 1 is determined at the time t5. In this example, at the time t5, since the target transmission torque, that is, the target clutch transmission load decreases over time, the mode determination unit 112 determines that the operating mode is the "release mode".

Since the operating mode is determined to be the "release mode" at the time t5, the duty output unit 124 outputs the release duty as the output duty after the time t5.

As illustrated in the upper part (A) in FIG. 8, when the duty is calculated and output in the calculation cycle of the feedback control unit 121, the actual load is delayed in following the target clutch transmission load as compared with the present embodiment.

As described above, in the present embodiment, the duty switching timing when the operating mode is changed is a timing faster than the cycle of the feedback control. That is, in the present embodiment, the duty output unit 124 outputs the output duty in a cycle shorter than the calculation cycle of the feedback control unit 121 for a predetermined period after the mode is determined by the mode determination unit 112. Therefore, it is possible to shorten a dead time when updating the target, that is, when updating the operating mode, and to improve responsiveness. The "cycle shorter than the calculation cycle of the feedback control unit 121" corresponds to, for example, an interrupt processing cycle or an AD detection cycle.

Third Embodiment

Figure 9:
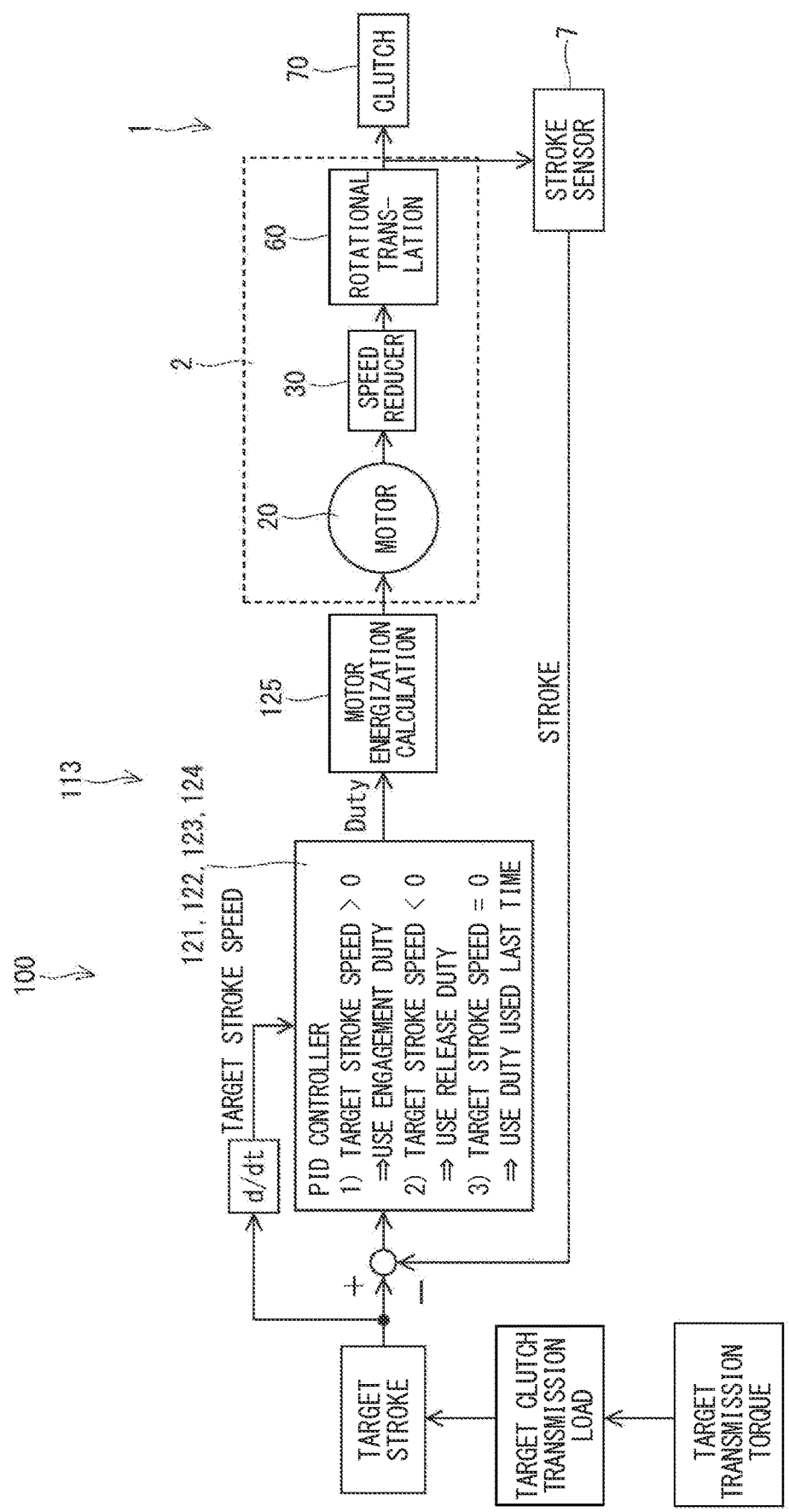
FIG. 9 is a block diagram illustrating a torque transmission device and a control device according to a third embodiment.

A control device according to a third embodiment will be described with reference to FIG. 9. The third embodiment is different from the first embodiment in a configuration of the control device 100, a method for controlling the actuator 2 by the control device 100, and the like.

In the present embodiment, the control device 100 includes a stroke sensor 7. The stroke sensor 7 is provided, for example, in the vicinity of the pressing unit 81. The stroke sensor 7 detects a relative position of the pressing unit 81 with respect to the housing 10 in an axial direction, and outputs a signal corresponding to the relative position to the control device 100. Accordingly, the control device 100 can detect the relative position, a movement amount, and the like of the pressing unit 81 with respect to the housing 10 in the axial direction based on the signal from the stroke sensor 7.

In the present embodiment, a target clutch transmission load, which is a load to be transmitted by the clutch 70, is calculated based on a target transmission torque. A target stroke, which is a target movement amount of the pressing unit 81 in the axial direction, is calculated based on the target clutch transmission load, and a stroke deviation, which is a deviation between the target stroke and the movement amount of the pressing unit 81 in the axial direction detected by the stroke sensor 7, that is, the stroke, is input to the feedback control unit 121. A target stroke speed is calculated based on the target stroke, and is input to the feedback control unit 121.

Based on the mode determined by the mode determination unit 112, the duty output unit 124 switches the engagement duty or the release duty and outputs the switched duty as the output duty. Specifically, in an engagement mode, that is, when the target stroke speed is larger than 0, the engagement duty is used, and the engagement duty is output to the energization control unit 125 as the output duty. In a release mode, that is, when the target stroke speed is smaller than 0, the release duty is used, and the release duty is output to the energization control unit 125 as the output duty. In the steady mode, the duty (the engagement duty or the release duty) used last time is output to the energization control unit 125 as the output duty.

As described above, in the present embodiment, the feedback control unit 121 feedback-controls the actuator 2 based on the target transmission torque and the movement amount of the pressing unit 81 in the axial direction. Therefore, it is possible to cope with various controls regardless of a control target.

Fourth Embodiment

Figure 10:
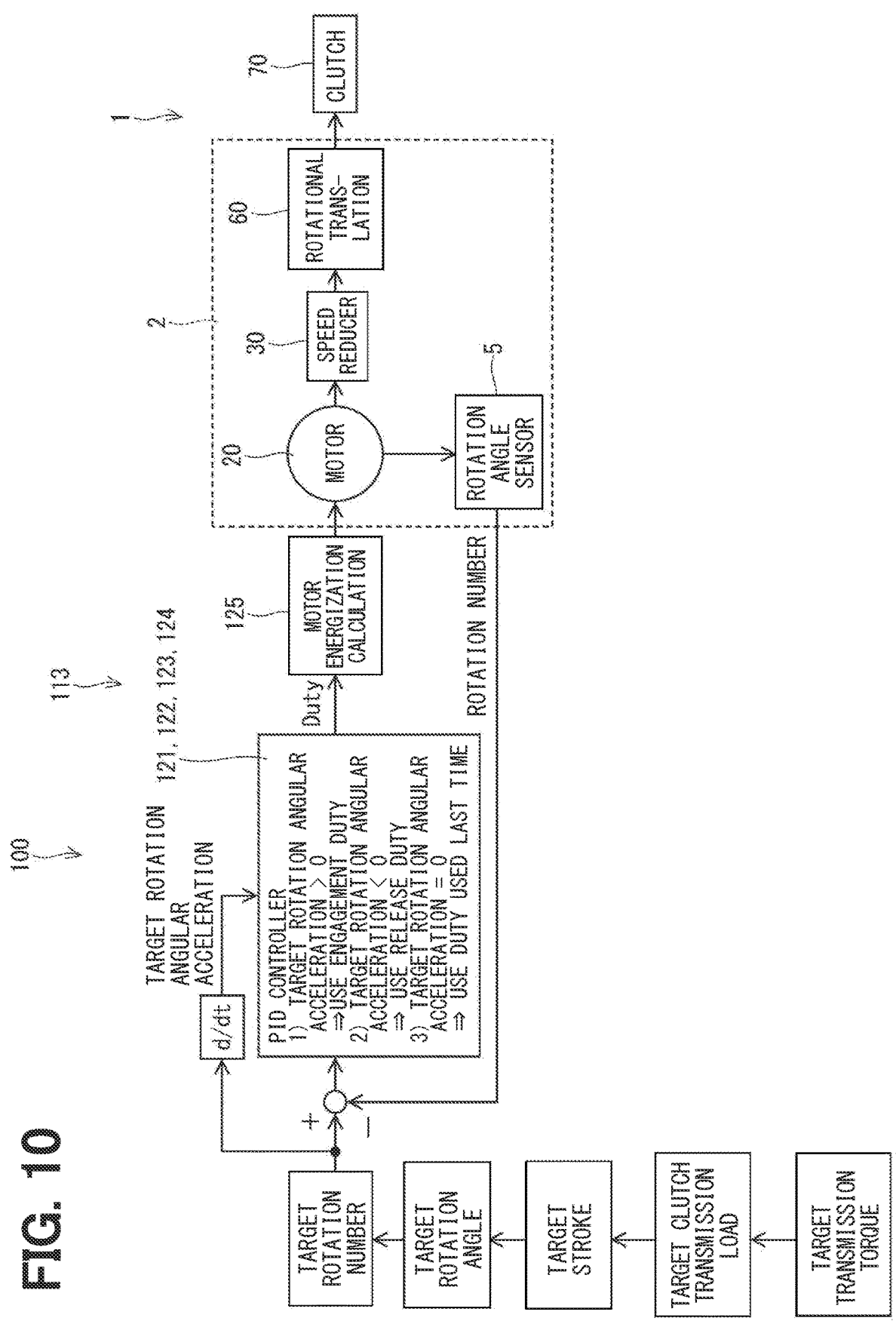
FIG. 10 is a block diagram illustrating a torque transmission device and a control device according to a fourth embodiment.

A control device according to a fourth embodiment will be described with reference to FIG. 10. The fourth embodiment is different from the first embodiment in a method for controlling the actuator 2 by the control device 100, and the like.

In the present embodiment, a target clutch transmission load, which is a load to be transmitted by the clutch 70, is calculated based on a target transmission torque. A target stroke, which is a target movement amount of the pressing unit 81 in the axial direction, is calculated based on the target clutch transmission load. A target rotation angle of the electric motor 20 is calculated based on the target stroke. A target rotation speed is calculated based on the target rotation angle, and a rotation speed deviation, which is a deviation between the target rotation speed and a rotation speed of the electric motor 20 detected by the rotation angle sensor 5, is input to the feedback control unit 121. A target rotation angular acceleration is calculated based on the target rotation speed, and is input to the feedback control unit 121.

Based on the mode determined by the mode determination unit 112, the duty output unit 124 switches the engagement duty or the release duty and outputs the switched duty as the output duty. Specifically, in an engagement mode, that is, when the target rotation angular acceleration is larger than 0, the engagement duty is used, and the engagement duty is output to the energization control unit 125 as the output duty. In a release mode, that is, when the target rotation angular acceleration is smaller than 0, the release duty is used, and the release duty is output to the energization control unit 125 as the output duty. In the steady mode, the duty (the engagement duty or the release duty) used last time is output to the energization control unit 125 as the output duty.

As described above, in the present embodiment, the feedback control unit 121 feedback-controls the actuator 2 based on the target transmission torque and the rotation speed of the electric motor 20. Therefore, it is possible to cope with various controls regardless of a control target.

Fifth Embodiment

Figure 11:
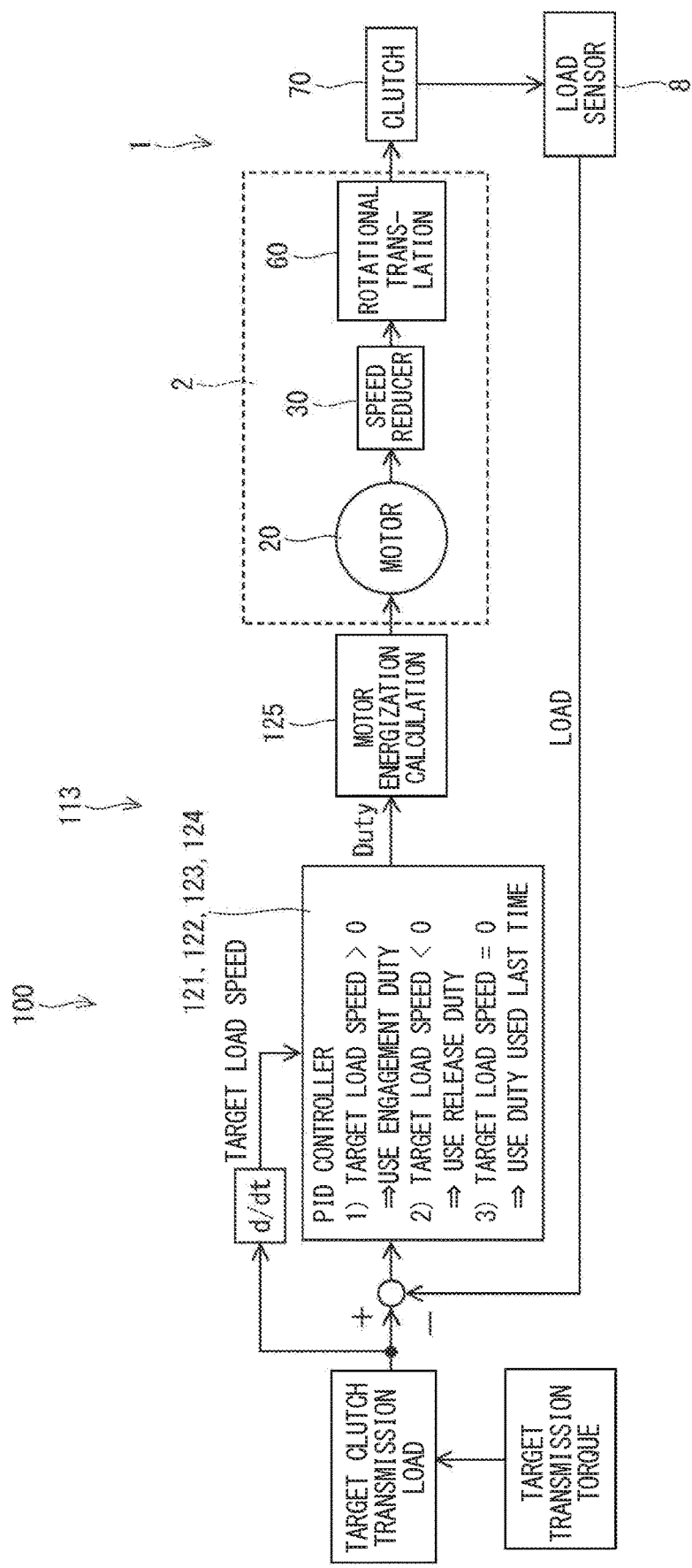
FIG. 11 is a block diagram illustrating a torque transmission device and a control device according to a fifth embodiment.

A control device according to a fifth embodiment will be described with reference to FIG. 11. The fifth embodiment is different from the first embodiment in a configuration of the control device 100, a method for controlling the actuator 2 by the control device 100, and the like.

In the present embodiment, the control device 100 includes a load sensor 8. The load sensor 8 is provided, for example, between the plate portion 622 and the friction plate 624 of the output shaft 62. The load sensor 8 detects an axial load acting on the clutch 70 from the pressing unit 81, and outputs a signal corresponding to the load to the control device 100. Accordingly, the control device 100 can detect the load acting on the clutch 70 from the pressing unit 81 based on the signal from the load sensor 8.

In the present embodiment, a target clutch transmission load, which is a load to be transmitted by the clutch 70, is calculated based on a target transmission torque, and a load deviation, which is a deviation between the target clutch transmission load and the load acting on the clutch 70 from the pressing unit 81 detected by the load sensor 8, is input to the feedback control unit 121. A target load speed is calculated based on the target clutch transmission load, and is input to the feedback control unit 121.

Based on the mode determined by the mode determination unit 112, the duty output unit 124 switches the engagement duty or the release duty and outputs the switched duty as the output duty. Specifically, in an engagement mode, that is, when the target load speed is larger than 0, the engagement duty is used, and the engagement duty is output to the energization control unit 125 as the output duty. In a release mode, that is, when the target load speed is smaller than 0, the release duty is used, and the release duty is output to the energization control unit 125 as the output duty. In the steady mode, the duty (the engagement duty or the release duty) used last time is output to the energization control unit 125 as the output duty.

As described above, in the present embodiment, the feedback control unit 121 feedback-controls the actuator 2 based on the target transmission torque and the load acting on the clutch 70 from the pressing unit 81. Therefore, it is possible to cope with various controls regardless of a control target.

Sixth Embodiment

Figure 12:
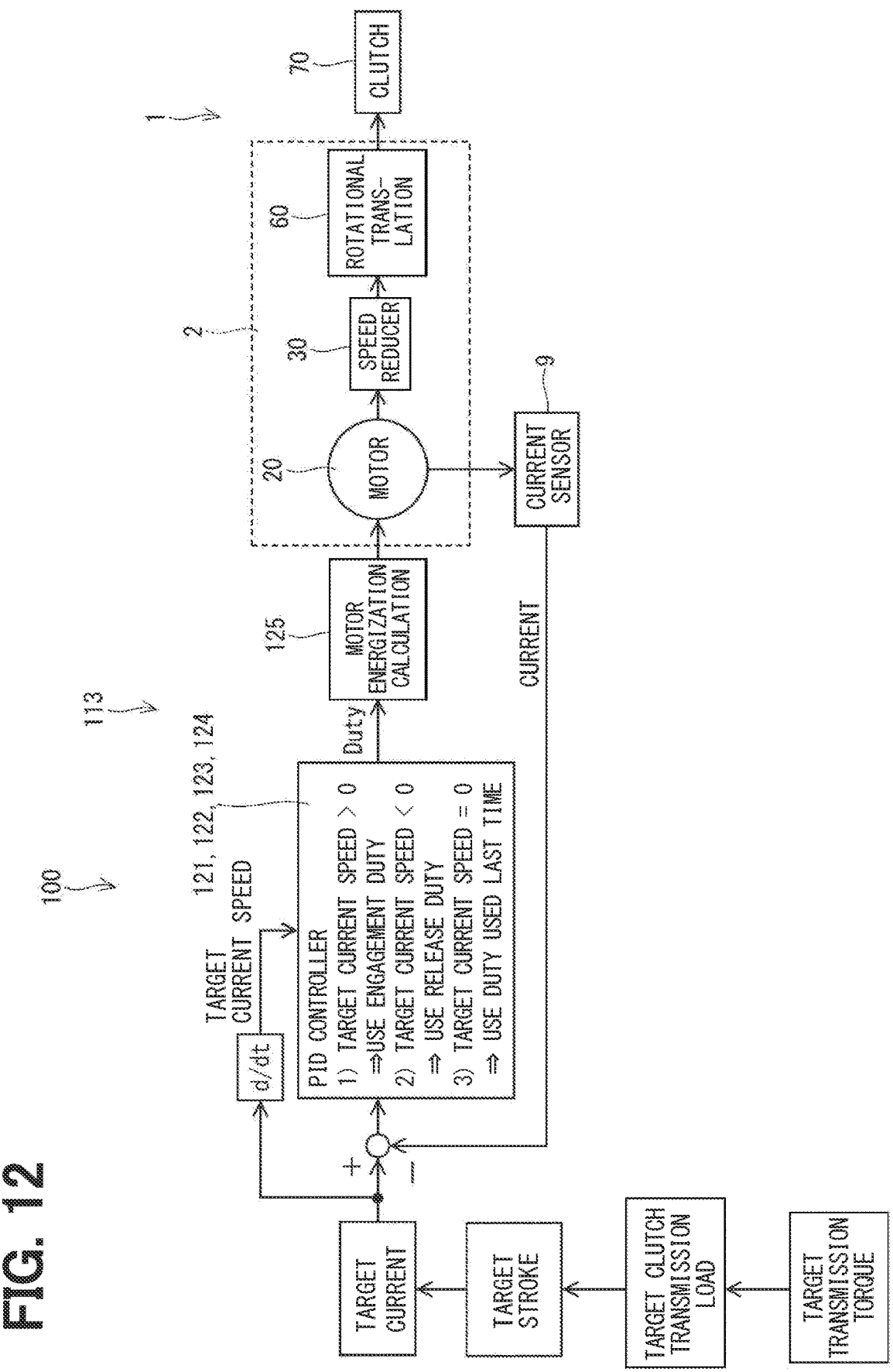
FIG. 12 is a block diagram illustrating a torque transmission device and a control device according to a sixth embodiment.

A control device according to a sixth embodiment will be described with reference to FIGS. 12 and 13. The sixth embodiment is different from the first embodiment in a configuration of the control device 100, a method for controlling the actuator 2 by the control device 100, and the like.

In the present embodiment, the control device 100 includes a current sensor 9. The current sensor 9 detects a current flowing through the electric motor 20, and outputs a signal corresponding to the current to the control device 100.

Accordingly, the control device 100 can detect the current flowing through the electric motor 20 based on the signal from the current sensor 9.

In the present embodiment, a target clutch transmission load, which is a load to be transmitted by the clutch 70, is calculated based on a target transmission torque. A target stroke, which is a target movement amount of the pressing unit 81 in the axial direction, is calculated based on the target clutch transmission load. A target current, which is a current to be supplied to the electric motor 20, is calculated based on the target stroke, and a current deviation, which is a deviation between the target current and the current flowing through the electric motor 20 detected by the current sensor 9, is input to the feedback control unit 121. A target current speed is calculated based on the target current, and is input to the feedback control unit 121.

Based on the mode determined by the mode determination unit 112, the duty output unit 124 switches the engagement duty or the release duty and outputs the switched duty as the output duty. Specifically, in an engagement mode, that is, when the target current speed is larger than 0, the engagement duty is used, and the engagement duty is output to the energization control unit 125 as the output duty. In a release mode, that is, when the target current speed is smaller than 0, the release duty is used, and the release duty is output to the energization control unit 125 as the output duty. In the steady mode, the duty (the engagement duty or the release duty) used last time is output to the energization control unit 125 as the output duty.

Figure 13:
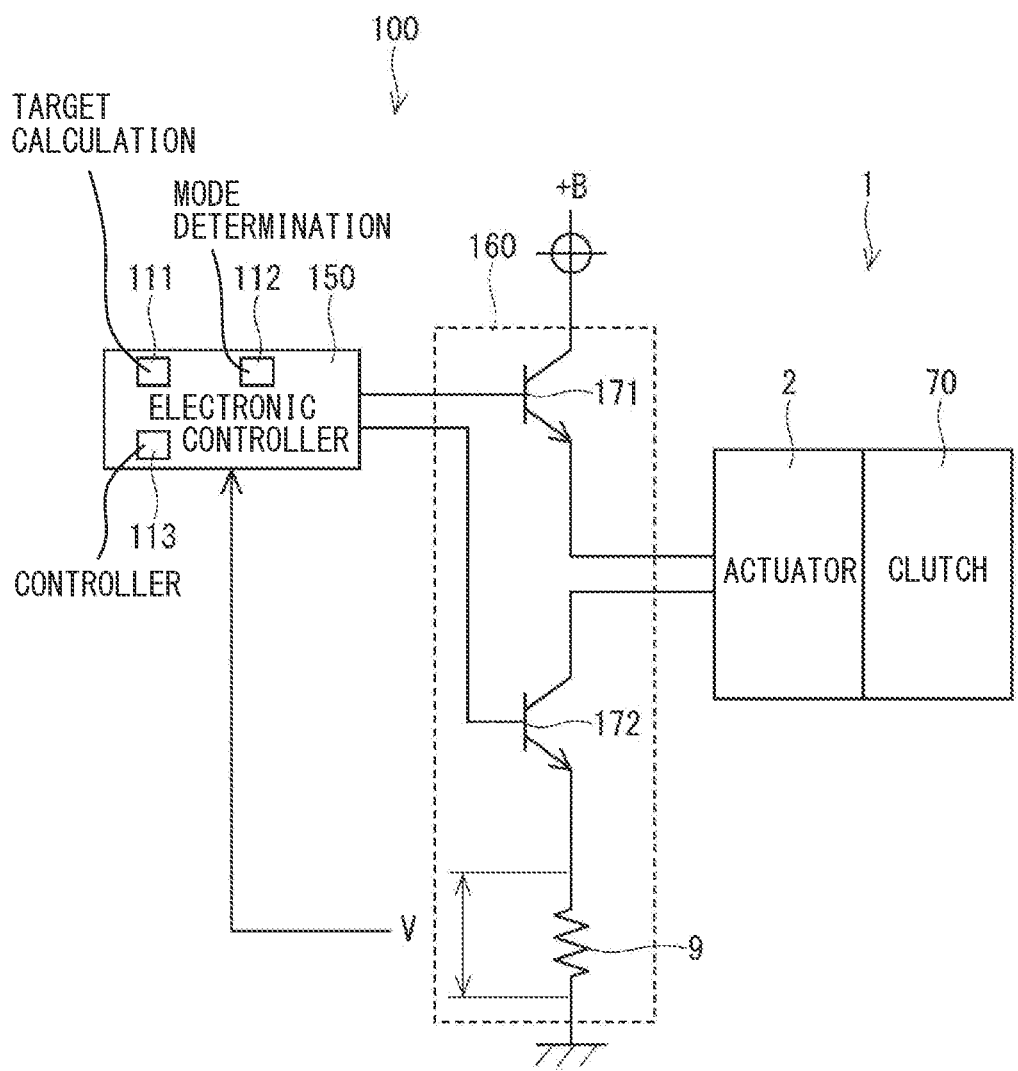
FIG. 13 is a schematic diagram illustrating the torque transmission device and the control device according to the sixth embodiment.

As illustrated in FIG. 13, the control device 100 includes an electronic controller 150 and a driver 160. The electronic controller 150 includes the target calculation unit 111, the mode determination unit 112, and the control unit 113. As described above, the control unit 113 includes the feedback control unit 121, the gain setting unit 122, the duty calculation unit 123, the duty output unit 124, and the energization control unit 125.

In the present embodiment, the feedback control unit 121 is a circuit implemented by software, that is, a soft feedback circuit, and feedback-controls the actuator 2 based on the target transmission torque and the current flowing through the electric motor 20.

The driver 160 includes switching elements 171 and 172 and the current sensor 9. The switching element 171 is connected to the electronic controller 150, the actuator 2, and a positive electrode of a battery of a vehicle. The switching element 172 is connected to the electronic controller 150, the actuator 2, and the current sensor 9. The current sensor 9 is connected to the switching element 172 and a ground of the vehicle.

The energization control unit 125 can control energization of the electric motor 20 of the actuator 2 by controlling operation of the switching elements 171 and 172.

When a current flows through the electric motor 20, a potential difference is generated between one end and the other end of the current sensor 9. Accordingly, the feedback control unit 121 of the control unit 113 can detect the current flowing through the electric motor 20.

In the present embodiment, the target transmission torque is calculated by the target calculation unit 111 of the electronic controller 150, and the output duty is calculated by the duty calculation unit 123 of the control unit 113 of the electronic controller 150 and output by the duty output unit 124.

As described above, in the present embodiment, the feedback control unit 121 feedback-controls the actuator 2 based on the target transmission torque and the current flowing through the electric motor 20. Therefore, it is possible to cope with various controls regardless of a control target.

Seventh Embodiment

Figure 14:
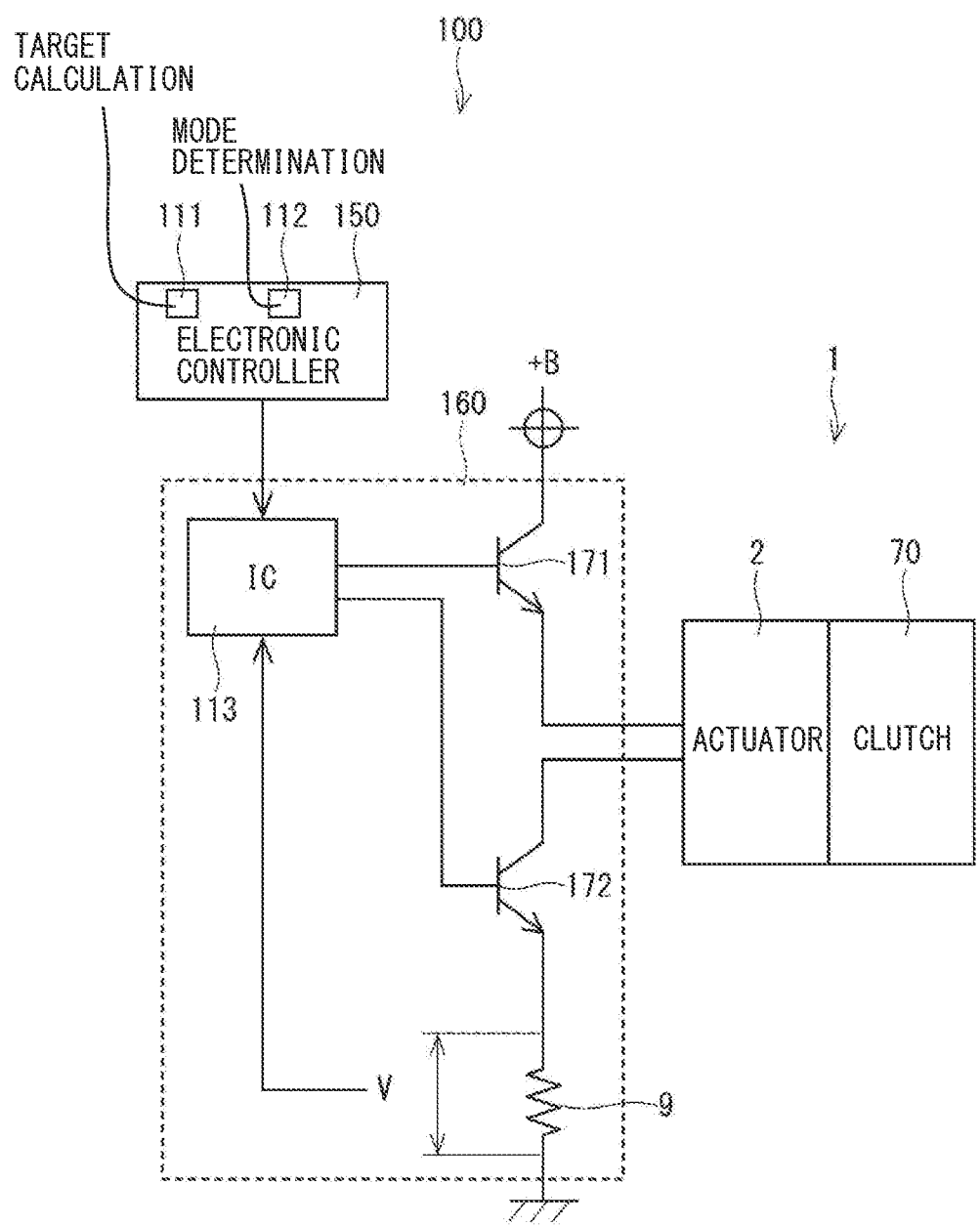
FIG. 14 is a schematic diagram illustrating a torque transmission device and a control device according to a seventh embodiment.

A control device according to a seventh embodiment will be described with reference to FIG. 14. The seventh embodiment is different from the sixth embodiment in a configuration of the control device 100 and the like.

In the present embodiment, unlike the sixth embodiment, the electronic controller 150 does not include the control unit 113. The driver 160 further includes the control unit 113. That is, the control unit 113 is provided in the driver 160 integrally with the switching elements 171 and 172 and the current sensor 9. Here, the control unit 113 is, for example, a circuit implemented by hardware such as an IC. The control unit 113 includes a feedback control unit 121, a gain setting unit 122, a duty calculation unit 123, a duty output unit 124, and an energization control unit 125.

In the present embodiment, the feedback control unit 121 is a circuit implemented by hardware, that is, a hard feedback circuit, and feedback-controls the actuator 2 based on a target transmission torque and a current flowing through the electric motor 20.

The control unit 113 is connected to the electronic controller 150, the switching elements 171 and 172, and the current sensor 9.

The energization control unit 125 of the control unit 113 can control energization of the electric motor 20 of the actuator 2 by controlling operation of the switching elements 171 and 172.

The feedback control unit 121 of the control unit 113 can detect the current flowing through the electric motor 20.

In the present embodiment, the target transmission torque is calculated by the target calculation unit 111 of the electronic controller 150, and an output duty is calculated by the duty calculation unit 123 of the control unit 113 and output by the duty output unit 124.

As described above, in the present embodiment, the feedback control unit 121 is a circuit implemented by hardware, and feedback-controls the actuator 2 based on the target transmission torque and the current flowing through the electric motor 20. Therefore, an inexpensive driver IC can be selected when implementing the control unit 113, and the cost can be reduced.

Eighth Embodiment

A control device according to an eighth embodiment will be described with reference to FIG. 15. The eighth embodiment is different from the first embodiment in a method for controlling the actuator 2 by the control device 100 and the like.

Figure 15:
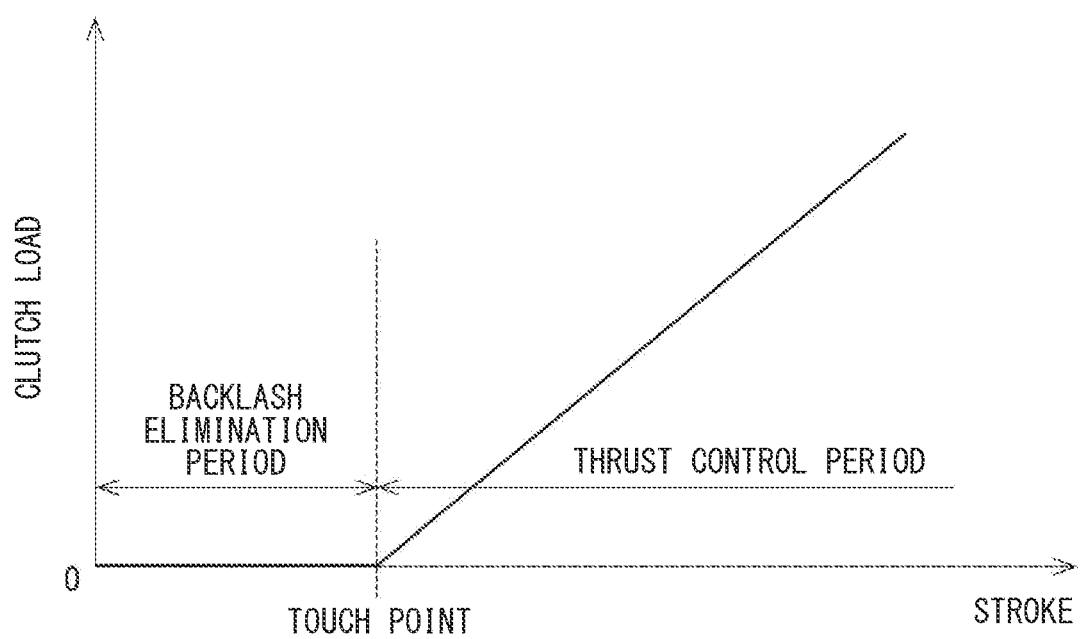
FIG. 15 is a diagram illustrating operation of a torque transmission device and a control device according to an eighth embodiment, and illustrating a relation between a clutch load and a stroke.

FIG. 15 illustrates a relation between a relative position of the pressing unit 81 with respect to the housing 10 in an axial direction, that is, a stroke of the pressing unit 81, and an actual transmission load of the clutch 70, that is, a clutch load.

In the present embodiment, the duty output unit 124 switches an engagement duty or a release duty and outputs the switched duty as an output duty only when a reaction force from the clutch 70 to the actuator 2 is larger than 0.

As illustrated in FIG. 15, specifically, in a backlash elimination period in which the pressing unit 81 approaches the clutch 70 and a gap between the pressing unit 81 and the clutch 70 is reduced, that is, when the reaction force from the clutch 70 to the actuator 2 is 0 or less, the duty output unit 124 outputs one of the engagement duty and the release duty as the output duty without switching the engagement duty or the release duty.

In a thrust control period in which the pressing unit 81 presses the clutch 70 and the clutch load becomes larger than 0 after a touch point at which the pressing unit 81 comes into contact with the clutch 70, that is, when the reaction force from the clutch 70 to the actuator 2 is larger than 0, the duty output unit 124 switches the engagement duty or the release duty and outputs the switched duty as the output duty based on a mode determined by the mode determination unit 112.

As described above, in the present embodiment, the duty output unit 124 switches the engagement duty or the release duty and outputs the switched duty as the output duty only when the reaction force from the clutch 70 to the actuator 2 is larger than 0. Since there is no influence of the load of the clutch 70 in the backlash elimination period, a processing load can be limited without executing the switching processing described above.

OTHER EMBODIMENTS

In the above-described embodiments, an example is illustrated in which the duty output unit 124 outputs the duty (the engagement duty or the release duty) used last time as the output duty when the mode determination unit 112 determines that the operating mode is the steady mode (see FIGS. 3 to 5). On the other hand, in other embodiments, when the mode determination unit 112 determines that an operating mode is a steady mode, the duty output unit 124 fixes one of an engagement duty and a release duty and outputs the fixed duty as an output duty. Therefore, it is possible to facilitate a determination at the time of failure.

In the above-described embodiments, an example is illustrated in which the duty calculation unit 123 can calculate the engagement duty based on the engagement gain and calculate the release duty based on the release gain (see FIGS. 4 and 5). On the other hand, in the other embodiments, the duty calculation unit 123 may calculate the engagement duty based on an engagement gain or calculate the release duty based on a release gain based on a mode determined by the mode determination unit 112, and the duty output unit 124 may output the engagement duty or the release duty calculated by the duty calculation unit 123 as the output duty. In this way, by switching and calculating the engagement duty and the release duty by the duty calculation unit 123, it is possible to switch the engagement duty and the release duty and output the switched duty as the output duty from the duty output unit 124.

In the other embodiments, a torque may be received from a second transmission portion and output from a first transmission portion via a clutch. For example, when one of the first transmission portion and the second transmission portion is non-rotatably fixed, the rotation of the other of the first transmission portion and the second transmission portion can be stopped by bringing the clutch into an engaged state. In this case, the clutch is of a type that connects and disconnects the first transmission portion and the second transmission portion, of which one is fixed and the other relatively rotates with respect to another member, and that weakens or stops the transmitted power. Here, the clutch can function as a brake.

In the other embodiments, the clutch may be a dry clutch.

In the other embodiments, the clutch may be a single-disc clutch.

In the other embodiments, a torque transmission portion is not limited to the clutch and may have any configuration as long as the torque transmission portion is switched to a transmission state or a non-transmission state by operation of an actuator.

As described above, the present disclosure is not limited to the above embodiments and can be practiced in various forms without departing from the gist of the present disclosure.

The control unit and the technique according to the present disclosure may be achieved by a dedicated computer provided by constituting a processor and a memory programmed to execute one or more functions embodied by a computer program. Alternatively, the control circuit and the method described in the present disclosure may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer program may be stored, as instructions to be executed by a computer, in a tangible non-transitory computer-readable medium.

The present disclosure has been described on the basis of embodiments. However, the present disclosure is not limited to such embodiments and structures. The present disclosure also encompasses various modifications and variations within the scope of equivalents. Furthermore, various combination and formation, and other combination and formation including one, more than one or less than one element may be made in the present disclosure.

What is claimed is:

1. A control device that controls a torque transmission device, the torque transmission device including an actuator that operates by being energized and a torque transmission portion that is switched to a transmission state or a non-transmission state by the actuator operating, and configured to transmit a torque between a first transmission portion and a second transmission portion when the torque transmission portion is in the transmission state, the control device comprising:

a target calculation unit configured to calculate a target transmission torque that is a torque to be transmitted between the first transmission portion and the second transmission portion;

a mode determination unit configured to determine that an operating mode is an engagement mode when the target transmission torque increases over time, determine that the operating mode is a release mode when the target transmission torque decreases over time, and determine that the operating mode is a steady mode when the target transmission torque does not change over time; and a control unit configured to control the actuator based on the operating mode determined by the mode determination unit, wherein the control unit includes a feedback control unit configured to feedback-control the actuator based on the target transmission torque, a gain setting unit configured to set an engagement gain that is a gain used for feedback control executed by the feedback control unit, and a release gain that is a gain smaller than the engagement gain, a duty calculation unit configured to calculate an engagement duty based on the engagement gain and calculate a release duty based on the release gain,
a duty output unit configured to switch the engagement duty or the release duty based on the operating mode determined by the mode determination unit and output a switched duty as an output duty, and
an energization control unit configured to control energization of the actuator based on the output duty output from the duty output unit.

2. The control device according to claim 1, wherein the duty output unit outputs the output duty in a same cycle as a calculation cycle of the feedback control unit.

3. The control device according to claim 1, wherein the duty output unit outputs the output duty in a cycle shorter than a calculation cycle of the feedback control unit.

4. The control device according to claim 1, wherein the duty output unit switches the engagement duty or the release duty and output the switched duty as the output duty only when a reaction force from the torque transmission portion to the actuator is larger than 0.

5. The control device according to claim 1, wherein when the mode determination unit determines that the operating mode is the steady mode, the duty output unit fixes one of the engagement duty and the release duty and outputs a fixed duty as the output duty.

6. The control device according to claim 1, wherein the duty calculation unit calculates, based on the operating mode determined by the mode determination unit, the engagement duty based on the engagement gain or the release duty based on the release gain, and
the duty output unit outputs the engagement duty or the release duty calculated by the duty calculation unit as the output duty.

7. The control device according to claim 1, wherein the gain setting unit is configured to set the engagement gain and the release gain based on the target transmission torque or a temperature of the torque transmission portion.

8. The control device according to claim 1, wherein the actuator includes
an electric motor configured to output a torque, and
a pressing unit configured to move in an axial direction by the torque of the electric motor and press the torque transmission portion to switch a state of the torque transmission portion to the transmission state or the non-transmission state, and
the feedback control unit feedback-controls the actuator based on the target transmission torque, and a rotation angle of the electric motor, a movement amount of the pressing unit, a rotation speed of the electric motor, a load to be applied from the pressing unit to the torque transmission portion, or a current flowing through the electric motor.

9. The control device according to claim 8, wherein the feedback control unit is a circuit implemented by hardware, and feedback-controls the actuator based on the target transmission torque and a current flowing through the electric motor.

10. The control device according to claim 1, wherein the torque transmission portion is provided by a clutch that is switched to an engaged state or a disengaged state by a pressing force output from the actuator.

11. The control device according to claim 10, wherein the clutch is of a type configured to connect and disconnect the first transmission portion and the second transmission portion, of which one and another rotate with respect to an other member, in order to transmit power, or is of a type configured to connect and disconnect the first transmission portion and the second transmission portion, of which one is fixed and the other relatively rotates with respect to the other member, and to weaken or stop transmitted power.

12. The control device according to claim 10, wherein the clutch is a dry clutch or a wet clutch.

13. The control device according to claim 10, wherein the clutch is a single-disc clutch or a multi-disc clutch.

14. A control device that controls a torque transmission device, the torque transmission device including an actuator that operates by being energized and a torque transmission portion that is switched to a transmission state or a non-transmission state by the actuator operating, and configured to transmit a torque between a first transmission portion and a second transmission portion when the torque transmission portion is in the transmission state, the control device comprising a processor configured to:
calculate a target transmission torque that is a torque to be transmitted between the first transmission portion and the second transmission portion;
determine that an operating mode is an engagement mode when the target transmission torque increases over time, determine that the operating mode is a release mode when the target transmission torque decreases over time, and determine that the operating mode is a steady mode when the target transmission torque does not change over time;
control the actuator based on the operating mode,
feedback-control the actuator based on the target transmission torque,
set an engagement gain that is a gain used for feedback control executed, and a release gain that is a gain smaller than the engagement gain,
calculate an engagement duty based on the engagement gain and calculate a release duty based on the release gain,
switch the engagement duty or the release duty based on the operating mode determined and output a switched duty as an output duty, and
control energization of the actuator based on the output duty.

* * * * *